US007353198B2

(12) United States Patent
Rios et al.

(10) Patent No.: US 7,353,198 B2
(45) Date of Patent: Apr. 1, 2008

(54) METHOD AND SYSTEM FOR MANAGING A MORTGAGE-BACKED SECURITIES INDEX

(75) Inventors: David Rios, Long Island City, NY (US); Matt Ruppel, New York, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 1485 days.

(21) Appl. No.: 09/931,149

(22) Filed: Aug. 16, 2001

(65) Prior Publication Data

US 2003/0074306 A1 Apr. 17, 2003

(51) Int. Cl.
*G06Q 40/10* (2006.01)
(52) U.S. Cl. .................................. 705/36 R; 705/38
(58) Field of Classification Search ............. 705/36 R
See application file for complete search history.

(56) References Cited

U.S. PATENT DOCUMENTS

| 5,227,967 | A | 7/1993 | Bailey |
| 5,774,880 | A | 6/1998 | Ginsberg |
| 5,812,987 | A | 9/1998 | Luskin et al. |
| 5,812,988 | A | 9/1998 | Sandretto |

(Continued)

FOREIGN PATENT DOCUMENTS

| DE | 2117811 | 10/1972 |

(Continued)

OTHER PUBLICATIONS

O'Leary, Christopher, CMBS Market is Transformed by Info and Indexes, Investment Dealers' Digest, Jun. 28, 1999, vol. 65, Issue 26, p. 61-62.*

(Continued)

*Primary Examiner*—Lalita M. Hamilton
*Assistant Examiner*—Samuel Weis
(74) *Attorney, Agent, or Firm*—Ostrolenk, Faber, Gerb & Soffen, LLP

(57) ABSTRACT

A system and method for generating and managing a generic mortgage-backed securities index. Bonds are selected for the index on a monthly basis. In order to determine which bonds will be represented in the index during a particular month, a set of calculations is performed during the second business week of the preceding month. For the purpose of selecting bonds for the index, all outstanding mortgage-backed securities are considered. They are first aggregated into pools based on their coupon and original term, and then their total outstanding principals are considered. If the total principal outstanding of any 30-year coupon represents more than a predetermined percentage such as 1.5% of the total, then this 30-year coupon will be included in the Index. Similarly, if the total principal outstanding on any 15-year coupon represents more than a second predetermined percentage such as 0.4% of the total, then this 15-year coupon will be included in the Index. The performance of the Index is measured by its total return. An algorithm for calculating the total return of the generic Index is also provided. The total return of the index partially depends on the relative weight assigned to each particular security included in the index. The present invention provides a method of assigning relative weights in accordance with relative proportions of different individual securities in the index, and covers the frequency of re-weighting.

66 Claims, 9 Drawing Sheets

U.S. PATENT DOCUMENTS

| | | | |
|---|---|---|---|
| 5,819,238 | A | 10/1998 | Fernholz |
| 5,940,810 | A | 8/1999 | Traub |
| 5,987,435 | A | 11/1999 | Weiss et al. |
| 6,026,381 | A | 2/2000 | Barton, III et al. |
| 6,058,377 | A | 5/2000 | Traub et al. |
| 6,061,663 | A | 5/2000 | Bloom et al. |
| 6,901,383 | B1 * | 5/2005 | Ricketts et al. ........... 705/36 R |
| 2001/0034695 | A1 | 10/2001 | Wilkinson |

FOREIGN PATENT DOCUMENTS

| | | |
|---|---|---|
| EP | 91900363.2 | 11/1991 |
| JP | 05082255 | 10/1994 |

OTHER PUBLICATIONS

Reinebach, Adam, Total Return Managers Call for CMBS Index, Investment Dealers' Digest, Sep. 7, 1998, vol. 64, Issue 36, p. 12.*

Jones, Andrew B., Ratings of Residential Mortgage Backed Securities, The Journal of Fixed Income, Mar. 1995, p. 12.*

Alex Goblin, "New CMBS Index Aids Investor"; *The Real Estate Finance Journal*, Winter 2000, pp. 62-68, Egan, Minnesota.

Justyna Pawlak, "Nationsbanc Unveils First Comprehensive CMBS Index"; *BondWeek*, Oct. 26, 1998, pp. 1 and 10, vol. XVIII, No. 43 (pp. 1 and 10 provided), New York, New York-Institutional Investor.

L. Dynkin, J.Hyman, V.Konstantinovsky, and N.Roth, "MBS Index Returns: A Detailed Look"; *The Journal of Fixed Income*, Mar. 1999, pp. 9-23, vol. 8, No. 4, New York, New York, Institutional Investor.

Investment Dealers' Digest, Jun. 28, 1999, pp. 4-5.

MBS Index Returns: A Detailed Look, Journal of Fixed Income, Mar. 1999.

Bondweek, Oct. 26, 1998.

Fleming, M.F., The Benchmark U.S. Treasury Market: Recent Performance and Possible Alternatives, Federal Reserve Bank of New York Economic Policy Review, 6, 1, 129, Apr. 2000, pp. 5 and 11.

* cited by examiner

FIG. 3

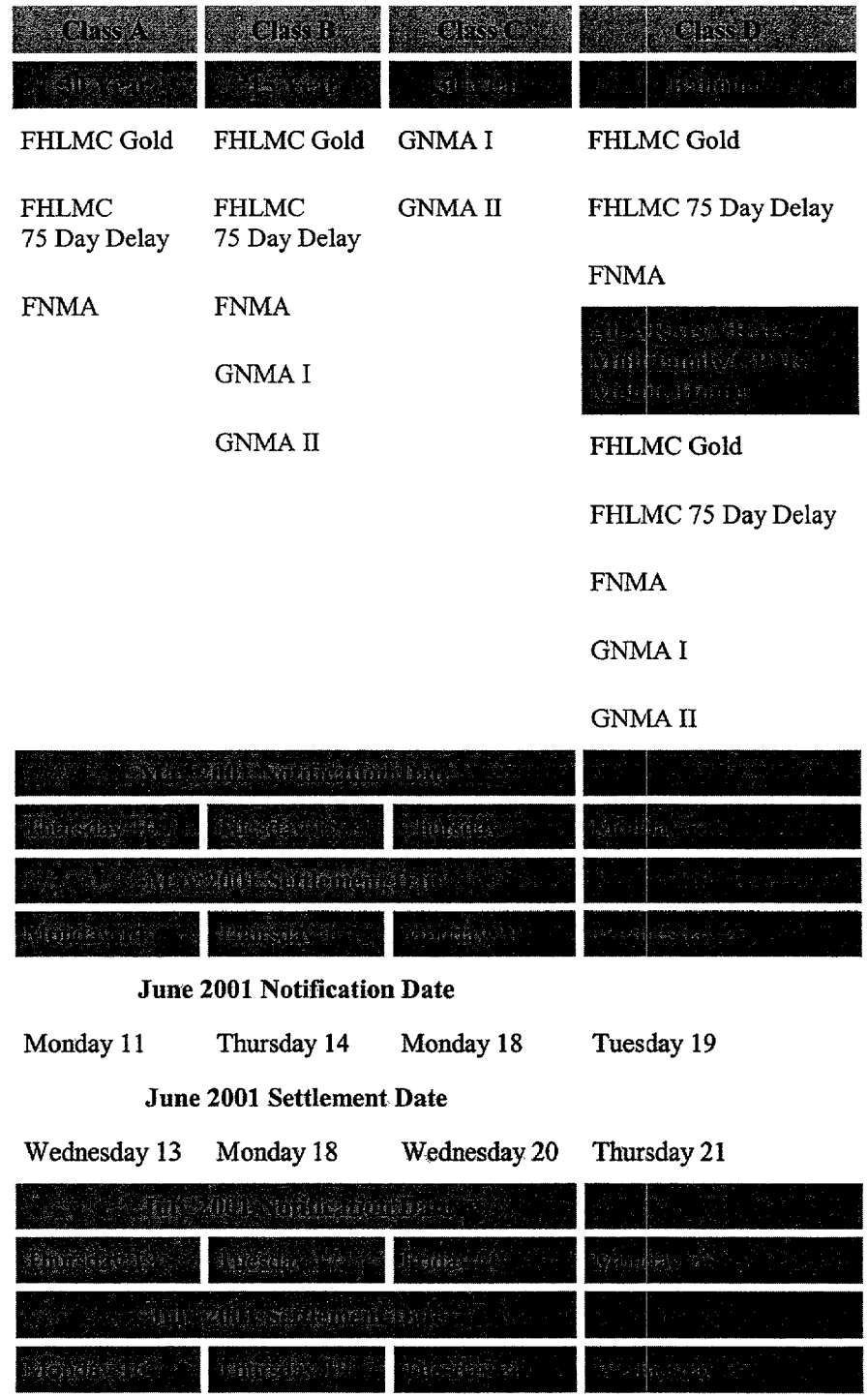

| Class A | Class B | Class C | Class D |
|---|---|---|---|
| 30 years | 15 year | 30 year | 30 year |
| FHLMC Gold | FHLMC Gold | GNMA I | FHLMC Gold |
| FHLMC 75 Day Delay | FHLMC 75 Day Delay | GNMA II | FHLMC 75 Day Delay |
| FNMA | FNMA | | FNMA |
| | GNMA I | | *ARM / Balloon / Midget / GPM / Manufactured* |
| | GNMA II | | FHLMC Gold |
| | | | FHLMC 75 Day Delay |
| | | | FNMA |
| | | | GNMA I |
| | | | GNMA II |

May 2001 Notification Date

| Thursday 10 | Tuesday 15 | Friday 18 | Monday 21 |

May 2001 Settlement Date

| Monday 14 | Thursday 17 | Tuesday 22 | Thursday 24 |

June 2001 Notification Date

| Monday 11 | Thursday 14 | Monday 18 | Tuesday 19 |

June 2001 Settlement Date

| Wednesday 13 | Monday 18 | Wednesday 20 | Thursday 21 |

July 2001 Notification Date

| Thursday 12 | Tuesday 17 | Friday 20 | Monday 23 |

July 2001 Settlement Date

| Monday 16 | Thursday 19 | Tuesday 24 | Thursday 26 |

August 2001 Notification Date

| Thursday 9 | Tuesday 14 | Friday 17 | Tuesday 21 |

August 2001 Settlement Date

| Monday 13 | Thursday 16 | Tuesday 21 | Thursday 23 |

METHOD AND SYSTEM FOR MANAGING A MORTGAGE-BACKED SECURITIES INDEX

BACKGROUND OF THE INVENTION

1. Field of the Invention

The invention generally relates to a method and system for generating an Index-type benchmark for a mortgage-backed securities (MBS) sector of the securities market.

2. Description of the Related Art

In the stock market, an index is a device that measures changes in the prices of a basket of shares, and represents the changes using a single Fig. The purpose is to give investors an easy way to see the general direction of shares in the index. The FTSE 100 Index, for example, is calculated by taking a weighted average of the share prices of the largest 100 companies on the London Stock Exchange. Launched in 1984 with a base Fig. of 1,000, the FTSE is calculated continuously throughout the trading day.

Generally speaking, an index is defined by a pre-determined universe of individual issues valued or weighted in proportion to their size within the whole universe of issues. The Standard & Poor's 500 Index is an example of such an index and is based on the common stocks of the 500 largest corporations which trade on United States exchanges. Illustratively, the weighting for each different security in the S & P 500 index is simply the market capitalization of that security expressed as a percentage of the total market capitalization taken across all the securities then in the index. Of course, these weights continually change as share prices move which, in turn, changes market capitalization both of each individual security in the index as well as that across the entire index. Other indices, such as the Value Line index, assign their own, e.g. equal, weightings to each security therein.

Capitalization weighting is the most common approach to equity indices and equity portfolios. Cap-weighted portfolios are easy to maintain because the rebalancing process takes care of itself. An algorithm for rebalancing a capitalization weighted stock index is disclosed, for example, in U.S. Pat. No. 6,061,663 (the '663 patent). The '663 patent teaches a method and system for rebalancing an equity portfolio based on weighting characteristics of individual securities. Similar to other known equity indices, e.g. S&P 500 Index, in the '663 patent the weighting characteristic of a particular security is based on the market capitalization of that security expressed as a percentage of the total market capitalization taken across all the securities then in the index. The computer program disclosed in the '663 patent includes instructions to classify stocks in the index into several categories by comparing their capitalization weight to a threshold level.

Similarly, U.S. Pat. No. 5,819,238 (the '238 patent) discloses a method for automatically modifying a financial portfolio having a pre-defined universe of securities, such as an index fund that tracks a given capitalization weighted index, through dynamic re-weighting of a position held in each such security. Specifically, in the disclosed computer system, a target weight is associated with each such security relative to others in the same portfolio in proportion to a non-constant function of current capitalization weights of the securities in the index. Once these target weights are determined, then, in response to both the target weight of each such security and an actual weight, as a proportion of the portfolio in which that security was held, a trade will be generated by the system in order to conform, within a predefined band, the actual weight to the target weight so as to rebalance the holdings in the portfolio.

For indices reflecting international securities markets, relative weights may be calculated based on countries' relative GDPs or imports.

Indices are currently used in the industry as benchmarks allowing investors and portfolio managers to compare performance of one sector of the securities market to others. Indices are often used in order to create index funds, i.e., funds that purchase securities that mimic or represent a specific index, for example the Vanguard 500 Index Fund mimics the composition and, supposedly, performance of the S & P 500 stock index.

Mortgage-Backed Securities are securities backed by mortgage loans, including pass-through securities, modified pass-through securities, mortgage-backed bonds, and mortgage pay-through securities. MBS are created when mortgage loans are pooled and underwritten by eligible issuers. Conmmonly referred to as "pass-through" certificates, these MBS entitle an investor to an undivided interest in the underlying mortgage loan pool. Thus, an investor receives a pro rata share of the interest (net of servicing and guaranty fees) and/or principal on the underlying mortgage loans.

Several financial institutions have developed indexes for measuring changes in the MBS markets. For example, Lehman Brothers has developed an MBS Index (hereinafter "LB MBS Index") which covers the mortgage-backed pass-through securities of GNMA (also known as "Ginnie Mae"), FNMA (also known as "Fannie Mae"), and FHIMC (also known as "Freddie Mac"). It is formed by grouping the universe of over 600,000 individual fixed rate MBS pools into approximately 3,500 generic aggregates. The aggregates included are priced daily using a matrix pricing routine based on trade price quotations by agency, program, coupon, and degree of seasoning. Lehman Brothers also developed a Mortgage-Backed Securities Index which is an unmanaged version of the LB MBS index and is composed of all fixed securities mortgage pools by GNMA, FNMA and the FHLMC, including GNMA Graduated Payment Mortgages.

In order to generate one of the LB MBS indices, a user must first select a set of securities that satisfy a number of subjective rules (for example, the total outstanding balance of each generic security must be at least $100 million), then price each issue within the index based on the provided "matrix pricing," calculate the returns of each individual security within the index and calculate the index return as a market-weighted average of individual security returns. The weights of individual securities are subjectively assigned and are not related to the proportion of the total outstanding principal on a particular security and total outstanding principal for the selected pool. Additionally, as explained further below, mortgage-backed securities are traded in "to-be-announced" (TBA) transactions where the purchase price is settled at some future TBA date. In order to calculate an index's total return, TBA settle prices for each security have to be converted into same-day-settle prices. According to the LB MBS Index's published algorithm, this process involves complicated calculations which include adjustments for an unknown future cash flow.

SUMMARY OF THE INVENTION

The present invention is directed to a method and system for generating an MBS Index by objectively selecting securities from all available mortgage-backed securities, assigning a relative weight to each selected security, evaluating the MBS Index by calculating its total return and periodically rebalancing the Index. There is a need in the industry for a system and method for generating an MBS Index, which would objectively select mortgage-based securities from the entire universe of available securities based on an easy-to-administer mathematical algorithm. There is also a need for a simple and objective system and method for calculating total return of the MBS Index based on same-day-settle price of each included security that would eliminate any guess work as to the future cash flow.

It is an object of the present invention to provide a system and method for generating an objective benchmark, which will accurately reflect the value of the MBS sector of the securities market.

It is another object of the present invention to provide a system and method for generating an MBS Index, which will take into consideration all outstanding mortgage-backed securities.

It is a further object of the present invention to provide a system and method for managing an MBS index, which can be easily automatically rebalanced.

It is still another object of the present invention to provide a system and method for generating and managing an MBS Index, which will allow portfolio managers to more precisely measure the performance of the mortgage-backed securities sector relative to other fixed-income investments.

It is still a further object of the present invention to provide a system and a method that allow portfolio managers to create mutual or exchange-traded finds, which will purchase, hold and sell mortgage-backed securities mimicking and/or representing the provided MBS Index.

In accordance with the preferred embodiment of the present invention, a system and method for generating and managing an MBS Index are provided. In order to determine which securities will be represented in the Index during a particular month, the system and method of the present invention perform a set of calculations during the second business week of the preceding month. For the purpose of selecting securities for the Index, all outstanding mortgage-backed securities are considered. They are preferably aggregated into pools based on their coupon and original term (e.g. 15 and 30 years). If the total principal outstanding for any 30-year coupon represents more than 1.5% of the total, then this 30-year coupon will be included in the Index. Similarly, if the total principal outstanding on any 15-year coupon represents more than 0.4% of the total, then this 15-year coupon will be included in the Index.

The performance of the Index is measured by its total return. The system and method of the invention calculate the total return of the generic Index in accordance with an algorithm which is provided herein. In the preferred embodiment, the total return of the Index depends on a total return of each security included in the index weighted according to the relative weight assigned to such particular security. The present invention provides a method of assigning relative weights, which represent relative proportions of different generic securities in the generic MBS Index, and covers the frequency of reweighing. In accordance with another embodiment of the present invention, the system and method may be modified to produce the relative weights of the individual securities within Conventional, Government, 30-year, and 15-year indices.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of the example described below and the Fig.s of the accompanying drawings in which like references denote like or corresponding parts, which in no way should be considered as a limitation of the invention.

FIG. 3 is the table of The Bond Market Association MBS Notification and Settlement Dates from May 2001 to August 2001, the list was last updated on Apr. 27, 2001;

DETAILED DESCRIPTION OF THE PREFERRED EMBODIMENTS AND THE DRAWINGS

Figure 1:
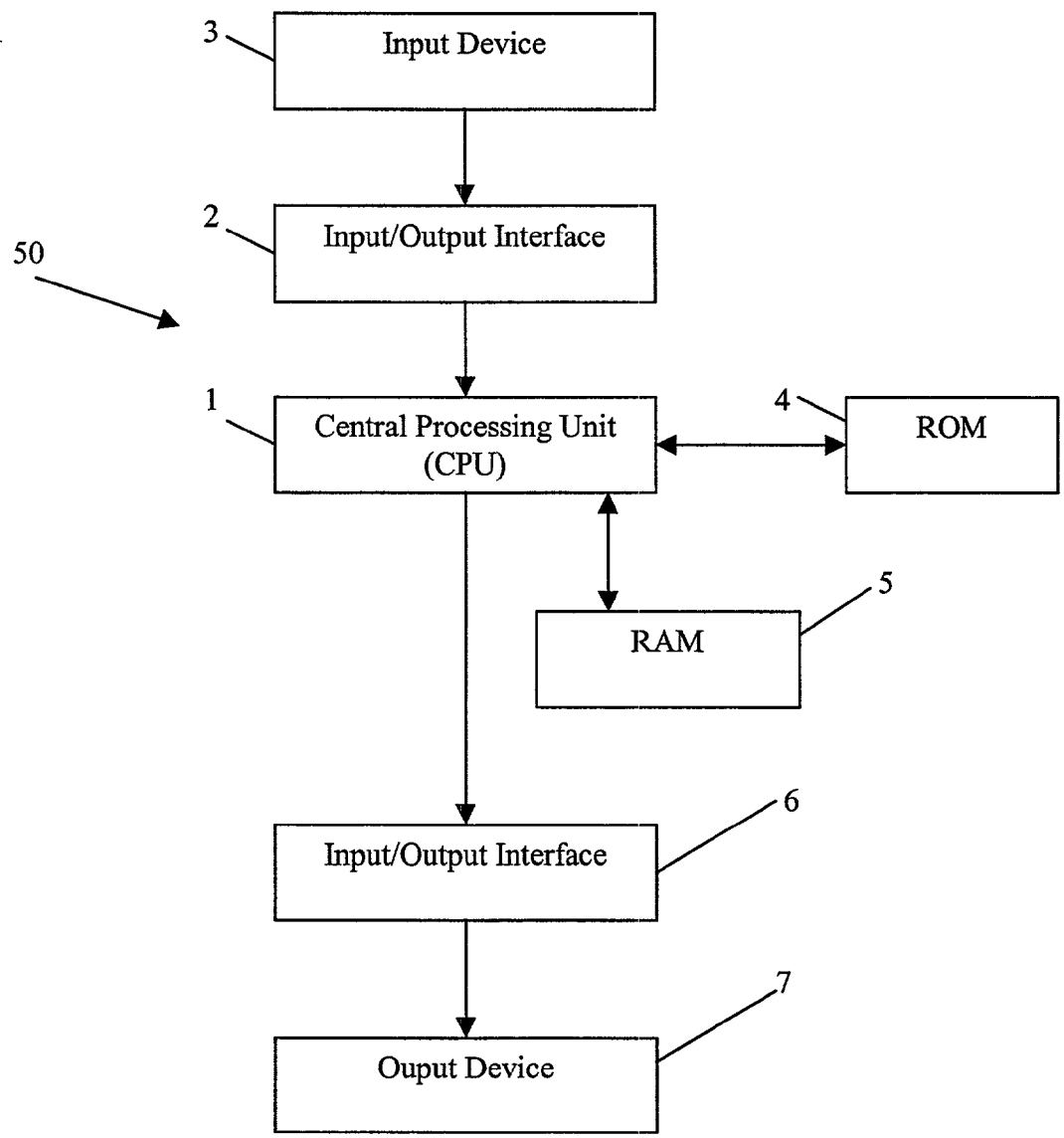
FIG. 1 is a block diagram of the system 50 of the present invention.
Figure 2:
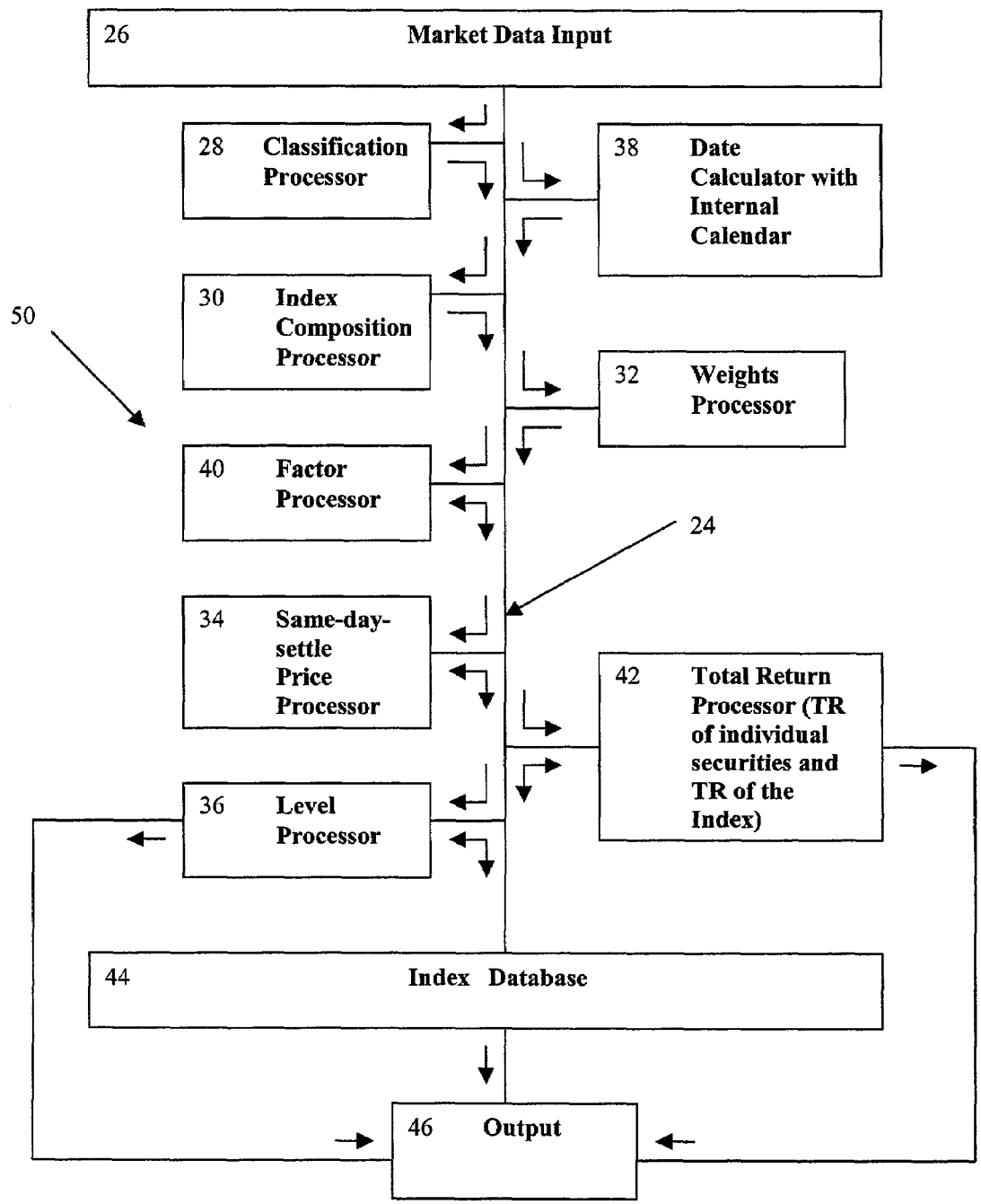
FIG. 2 is a functional diagram of the discrete components and information flow within the system for generating and managing an MBS Index in accordance with the present invention.

In accordance with the preferred embodiment of the present invention, a system and method for generating, evaluating and managing different Mortgage-Backed Securities Indices (hereinafter MBS Indices) are provided. The method of the invention is accomplished by a system, as shown in FIGS. 1 and 2 (described further below), which may be implemented by a general purpose computer operating in accordance with the instructions provided by the system. The system 50 is illustrated in the diagram of FIG. 1 and includes a central processing unit (CPU) 1, memory comprising ROM 4, for permanently storing program instructions, operating parameters, or other data required for system operation, and RAM 5, for the temporary storage and manipulation of data during the operation of the system 50. The system further includes an input device 3 which may be a keyboard, a handwriting recognition device, a voice recognition device or any other known device for inputting data including any type of hardware or software suitable for inputting data from another computer system or the Internet. The above described input devices are all designated in the diagram of FIG. 1 with a reference number 3. The input device 3 inputs data, operational parameters and commands to the CPU 1 through an input/output interface 2. Data is output from the CPU 1 through another input/output interface 6 to the output device 7 which may be a printer, a computer display, a modem, or any other known output device. As described in more detail below, the system may comprise a plurality of discrete components which perform the functions of selecting mortgage-backed securities to be included in the Index, assigning relative weight to each selected security, calculating the total return of the Index, calculating the level of the Index and other functions in accordance with the present invention. In the preferred embodiment, a single CPU performs these functions. Alternatively, separate CPUs may be used or the CPU may be segregated to perform the described functions.

The invention is described herein in connection with MESS indices implemented by Credit Suisse First Boston ("CSFB"), a global investment bank providing securities underwriting, sales and trading, investment banking, private equity, financial advisory and other related services. There are sixty four (64) different MBS indices currently developed by CSFB. This application discloses the invention with regard to the generic MBS Index (i.e., TBA Mortgage Index), unless otherwise specified. As will be apparent to one of ordinary skill in the art, the algorithm may be modified to generate and manage different MBS indices. This disclosure provides examples of such possible modifications where appropriate. For example, individual weight-calculating formulas are provided for Conventional, Government, 30-year and 15-year indices.

Figure 4:
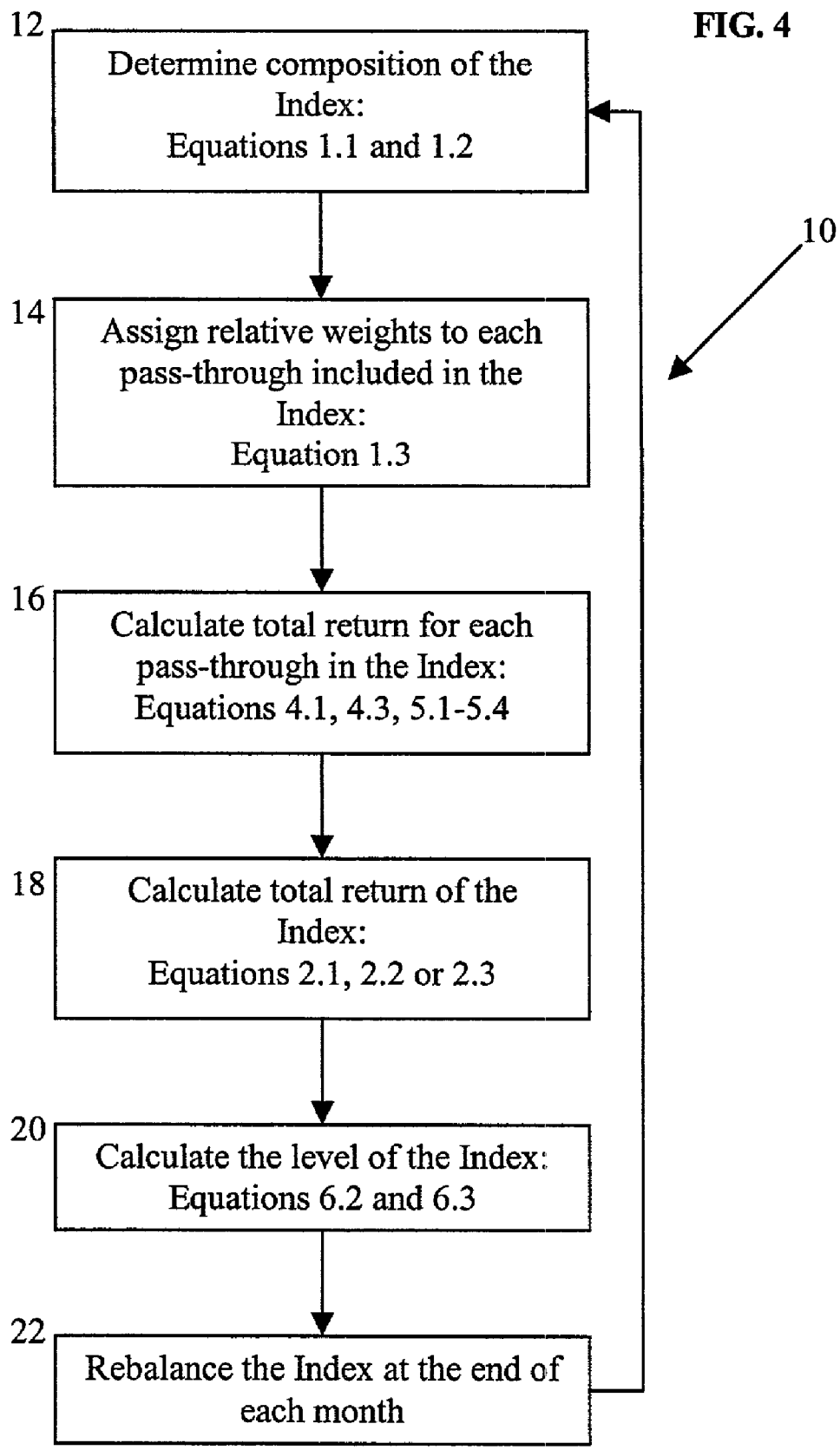
FIG. 4 is a schematic flow chart of the steps to be performed in the method of the present invention.

FIG. 4 is a flow chart of the method of the present invention. The method may be implemented by a general purpose computer operating in accordance with an algorithm 10 for generating, evaluating and rebalancing a generic MBS Index (i.e., TBA Mortgage Index). In accordance with the preferred embodiment of the present invention, all outstanding mortgage-backed securities are considered in block 12, in order to generate a generic MBS Index. These securities are either included or excluded from the Index based on their total principal outstanding. Equations 1.1 and 1.2 describe the conditions for inclusion and elimination of MBS securities. The relative weights are then assigned to each included security, in block 14, in accordance with Equation 1.3. To evaluate the performance of the provided Index over a desired time interval, a total return for each pass-through present in the Index during this time interval is first determined, block 16. This total return of each generic pass-through is calculated in accordance with Equation 4.1. Using these total returns for all generic securities calculated in block 16, the total return of the Index can be determined next, at block 18, using one of the Equations 2.1, 2.2 or 2.3, depending on the length of the desired time interval.

In accordance with the preferred embodiment, each provided Index may also be characterized by its level. The level of the Index is based on the total return of the Index over the life of the Index (or any other desired time interval) and is calculated in block 20 using Equations 6.2 and 6.3. Each Index is then rebalanced in block 22, preferably on the last business day of each month, by repeating the above steps 12 through 20 (blocks 12-20 of FIG. 4).

Referring specifically to the operations to be performed in blocks 12 and 14, Equations 1.1, 1.2 and 1.3 present the algorithm for including and excluding bonds in the TBA Mortgage Index as well as the method of assigning relative weights to the generic pass-throughs included in the Index. As described further below, this algorithm may be modified in the process of creating non-generic indices, for example, the Conventional, Government, 30-year, and 15-year indices. As will be obvious to one of ordinary skill in the art, other MBS indices may also be created based on the provided generic algorithm.

Generic mortgage-backed securities are preferably differentiated by agency, coupon, and original term only. Before the relative weights are computed, the composition of the Index has to be ascertained, i.e., it has to be determined which securities to include in the Index and which to exclude from the Index. For this purpose, all TBA-eligible pools (i.e., pools of mortgage-backed securities eligible for "to-be-announced" transactions) should be considered. TBA-eligible pools are defined by the Bond Market Association (also referred to in the present disclosure as PSA, i.e., Public Securities Association), and these definitions are incorporated herein by reference. These TBA-eligible pools will preferably include mortgage-backed securities issued by FNMA, GNMA I (i.e., modified pass-through mortgage-backed securities on which registered holders receive separate principal and interest payments on each of their certificates), GNMA II (i.e., modified pass-through mortgage-backed securities on which registered holders receive an aggregate principal and interest payment from a central paying agent on all of their Ginnie Mae II MBS), and/or FHLMC, all with fixed-rate coupons and original terms of 30 or 15 years. These pools are preferably aggregated based solely on coupon and original term. The original year term and the coupon value may be preprogrammed in the system or may be input into the system as operating parameters. Additional information related to these MBS may also be preprogrammed or input into the system.

In accordance with the preferred embodiment, if the total principal outstanding of any 30-year coupon represents more than 1.5% of the total outstanding principal for all considered pools, then that 30-year coupon will be included in the Index. Likewise, if the total principal outstanding on any 15-year coupon represents more than 0.4% of the total outstanding principal for all considered pools, then that 15-year coupon will be included in the Index. For example, if 30-year coupons having value of 8.5% represent more than 1.5% of the total principal outstanding, then FNMA 8.5, GNMA 8.5 and FHLMC 8.5 are all included in the generic TBA Mortgage Index. If, collectively, they represent less than 1.5% of the total outstanding, then none of these generic securities is included in the Index. The percentages (i.e., the 1.5% and 0.4% thresholds values) for each coupon term may be preprogrammed in the system or input into the system as operating parameters. In an alternative embodiment, after the above conditions are satisfied, the Index may include only the top six 30-year coupons and the top six 15-year coupons, as ranked by their outstanding principals. The number of coupons to be included in the index may also be preprogrammed or input into the system.

The data regarding outstanding principal amounts may be continuously streamed into the system or input into the system when it becomes available. The above calculations are preferably performed during the second full business week of each month, when the agencies' data becomes available, in order to determine which bonds to include in the Index as of the close of the last business day of that month. It should be noted that inclusion in one month does not guarantee inclusion in the next month. The time for performing the above calculations (i.e., the second full business week) may be preprogrammed in the system or input into the system as an operating parameter.

The total principal outstanding in a TBA eligible pool issued by agency a with a coupon c and original term t as of the first of each month is referred to herein as $\rho_{a,c,t}$, and, as noted above, is preferably calculated in the second week of that month for each fixed-rate agency pass through. Therefore, for each coupon and original term, the inclusion criterion $x_{c,t}$ may be defined by the following equations:

$$x_{c,360} = 1 \text{ if } x_{c,360} > 1.5\%$$

$$x_{c,180} = 1 \text{ if } x_{c,180} > 0.4\%$$

$$x_{c,t} = 0 \text{ otherwise,} \qquad \text{(Eq. 1.1)}$$

$$x_{c,t} = \frac{\left[\sum\limits_{a=\left\{\begin{array}{c}FNMA\\GNMA\\FHLMC\end{array}\right\}} \rho_{a,c,t}\right]}{\left[\sum\limits_{\substack{a=FNMA,GNMA,FHLMC\\c\in Z\\t=180,360}} \rho_{a,c,t}\right]} \quad \text{(Eq. 1.2)}$$

The system determines the composition of the index based on the preprogrammed values, operating parameters and the agencies' input principal data in accordance with the above equation to perform step 12 of FIG. 4.

After deciding which generic mortgage-backed securities are to be included in the Index, the relative weight of each generic pass-through may be assigned (step 14 of FIG. 4). In accordance with the present invention, the relative weights are based on the relation of the current outstanding principal of the considered generic pass-through to the total outstanding principal represented in the Index and are preferably expressed in percentage terms. These weights represent the relative proportions of different generic fixed-rate agency pass-throughs in the generic Index. In accordance with this embodiment, Equation 1.3 mathematically defines the weight of each generic pass-through in the generic TBA Mortgage Index as a function of agency, coupon, and original term as:

$$w = \frac{\lfloor x_{c,t}\rho_{a,c,t} \rfloor}{\left[\sum\limits_{\substack{a=FNMA,GNMA,FHLMC\\c\in Z\\t=180,360}} \rho_{a,c,t}\right]} \quad \text{(Eq. 1.3)}$$

Although the relative weights are preferably calculated during the second week of each month, they preferably become effective as of the close of the last business day of the month in which the calculation took place. The time for calculating the relative weights and the time they become effective may be preprogrammed in the system or input into the system as operating parameters. To ensure reliability of the data used in the disclosed calculations, the sources of all data pertaining to outstanding principals should be the agencies themselves. On the last business day of each month, a set of weights for each index is output or otherwise published.

The above algorithm for including and excluding generic pass-throughs and for calculating their relative weights within the generic MBS Index may be modified to produce the weights of the Conventional, Government, 30-year, and 15-year indices. An operation parameter may be input into the system to signal this modification in the provided method. For the Conventional Pass Through Index, when computing the weights using Equation 1.3, all weights assigned to Ginnie Mae pass-throughs are set to 0 during the final, step. Similarly, when computing the weights for the Ginnie Mae (i.e., "Government") Pass-Through Index using Equation 1.3, all weights assigned to non-Ginnie Mae pass-throughs are set to 0 during the final step. When computing the weights for the 30-Year Pass-Through Index using the above algorithm, all weights assigned to 180-month original term pass-throughs are set to 0 during the final step. Similarly, when computing the weights for the 15-Year Pass-Through Index using the above algorithm, all weights assigned to 360-month original term pass-throughs are set to 0 during the final step. Therefore, when total returns of these indices are calculated, total returns from the excluded securities will be equal to "0," and only returns from the included securities will be considered and outputted from the system. Thus, even though all outstanding mortgage-backed securities will be considered in the initial selection process, the total return, level and other performance characteristics provided to an end user will only relate to the desired Index. For example, if the user desires to receive information about performance of the 30-year MBS Index, total returns from all 15-year securities will be equal to "0" and the displayed characteristics will only relate to 30-year mortgage-backed securities.

With respect to step 18 of FIG. 4, one of the main characteristics of each of the provided indices is its total return. For limited periods of time, the total return of each index may be defined as an average total return of the bonds represented in that index. Hence, to calculate the total return over a short period of time it is first necessary to calculate which bonds are represented in the index during that time period, using the algorithm described above, and second, to calculate the return of each bond. For longer periods of time the total return is computed by compounding over a set of disjoint and complete subintervals of time.

As described above, on the last business day of each month a set of relative weights for issues included in the Index is introduced. For the month following the month when calculations took place these weights represent relative proportions of each pass-through selected to be in the Index. Therefore, from the last business day of any month to any business day of the following month, a fixed portfolio can represent the Index. Accordingly, over this time period the Index total return is equal to the total return of the representative portfolio. For longer time intervals, representative portfolios may be used to calculate the month-to-month returns. Compounding these returns gives the Index return over several months.

For example, to calculate the Index total return from Oct. 14, 2000 until Dec. 15, 2000, representative portfolios may be used to calculate the total returns for the months of Oct. 14, 2000 to Oct. 31, 2000, of Oct. 31, 2000 to Nov. 30, 2000, and of Nov. 30, 2000 until Dec. 15, 2000. The product of these three numbers is the Index total return from Oct. 14, 2000 to Dec. 15, 2000. The total return from Oct. 14, 2000 until Oct. 31, 2000 is the total return of the representative portfolio from Sep. 29, 2000 to Oct. 31, 2000 minims the return from Sep. 29, 2000 to Oct. 13, 2000.

To express the above example in algebraic form, consider a date $t_1$ in month k and a later date $t_2$ in month n. When k=n, the total return of the Index from the close of $t_1$ until the close of $t_2$ is, $$TR|_{t_1}^{t_2} = TR_{t_2} - TR_{t_1} \quad \text{(Eq. 2.1)},$$

where $TR_{t_1}$ is the month-to-date total return of said index on the day $t_1$, and $TR_{t_2}$ is the moth-to-date total return of said index on the day $t_2$.

Or when k=n−1, $$TR|_{t_2}^{t_2} = (1+TR_k-TR_{t_1})(1+TR_{t_2})-1 \quad \text{(Eq. 2.2)},$$

where $TR_k$ is the total return of the Index for the month k.

Or when k<n−1, $$TR\vert_{t_1}^{t_2} = (1+TR_k - TR_{t_1})\left[\prod_{i=k+1}^{n-1}(1+TR_i)\right](1+TR_{t_2}) - 1, \quad \text{(Eq. 2.3)}$$

where $TR_i$ is the total return of the Index for any intermediate month between k and n. In the preferred embodiment, $TR_i$ is the total return of the Index from the close of the last business day of the month i−1 to the close of the last business day of the month i. Both $TR_i$ and $TR_t$ are defined in Equations (3.1) and (3.2). Equations 2.1, 2.2 and 2.3 define the operations to be performed in step 18 of the flow chart of FIG. 4.

From the end of one month to the end of the next month, the total return of the Index is defined by the total return of a fixed representative portfolio. To compute the return of a representative portfolio one has to calculate the cost of buying the portfolio, same-day settle on the earlier date; the gain from selling the portfolio, same-day settle on the later date; and the value of any pay downs earned.

Let the set $$\{w_i^j\}_{j=1}^n$$

be the relative weights of the securities composing the generic Index as of the close of the last business day of month i−1. Then the total return of the Index from the close of the last business day of the month i−1 until the close of the last business day of month i is, $$TR_i = \frac{\sum_{j=1}^n w_i^j p_{ii}^j TR_i^j}{\sum_{j=1}^n w_i^j p_i^j}, \quad \text{(Eq. 3.1)}$$

where $TR_t^j$ is the total return of generic pass-through j over this time interval as will be shown in Equation 4.1, discussed with respect to step 16 of FIG. 4. The Equation 3.1 may be rewritten for $TR_k$ as:

$$TR_k = \frac{\sum_{j=1}^n w_k^j p_k^j TR_k^j}{\sum_{j=1}^n w_k^j p_k^j}, \quad \text{(Eq. 3.3)}$$

The price of each pass-through is preferably the same-day settle price, measured on close of the last business day of month i−1 (or k−1), and is denoted $p_i^j$ (or $p_k^j$ or simply $p_i$). Its computation is described further below (see Equations 5.1-5.5).

For any arbitrary business day t in any month i:

$$TR_t = \frac{\sum_{j=1}^n w_i^j p_i^j TR_i^j}{\sum_{j=1}^n w_i^j p_i^j}, \quad \text{(Eq. 3.2)}$$

where $TR_t^j$ is the total return of generic pass-through j from the close of the last business day of the month i−1 until the close of the business day, t.

As shown in FIG. 4, step 16, in order to calculate the total return of the Index, the total return of each generic pass-through has to be calculated first. In accordance with the preferred embodiment of the present invention, formulas for calculating the total return of each pass-through in the index for specific time periods are provided. The total return calculations involve buying and selling securities for the same-day settle price, however, the only prices observable in the marketplace are for the standard PSA (i.e., TBA) settle prices. Consequently the standard formulas typically used in the industry are based on PSA settle prices. In contrast, the method of calculating the total return of each pass-through in accordance with the present invention uses formulas which are based on the same-day settle prices, not standard PSA settle prices. Therefore, a conversion algorithm is provided by the present invention, as more particularly described in connection with Equations 5.1-5.5.

Consider a mortgage-backed security of coupon c. At the close of the last business day of a month an investor purchases $1 of the security for price $p_1$. On the close of an arbitrary business day of the following month the investor sells the remaining principal for price p2. The investor receives the coupon payment, $$\frac{c}{12},$$

and the pay down (1−f) due the month of sale, which is invested at rate r. These numbers suffice to calculate the total return of this security.

For a generic pass-through j, of fixed-rate coupon c, the total return from the close of business on the last business day $t_1$ of one month, to the close of business on an arbitrary business day, $t_2$, in the next month is defined as:

$$TR_{t_2}^j = \frac{-p_{t_1} + f_{t_1} p_{t_2} + \left[(1-f_{t_1}) + \frac{c}{12}\right]\left[1 + r_{t_1}\left\vert d\frac{1}{360}\right.\right]^{-k}}{p_{t_1}} \quad \text{(Eq. 4.1)}$$

The terms on the right hand side are:

$p_t$=price of the security on the close of t, same-day settle.

$r_t$=1-month BBA LIBOR on the close of t (provided by Reuters).

$f_t$=the pay-down factor of the pass-through as best determined by day t.

$$d = \begin{cases} 25 - \text{day of the month of } t_2, \text{ if bond } FNMA \\ \\ 15 - \text{day of the month of } t_2, \text{ if bond } GNMA \text{ or } FHLMC \end{cases}$$

$$k = \begin{cases} +1, & \text{if } d > 0 \\ \\ -1, & \text{if } d < 0 \end{cases}$$

Data for all of these terms is preferably input into the system.

The algorithm for computing $f_t$ is provided in Equation 4.3. Prices, rates, and coupons are preferably all considered as decimals, not percents. If $t_2$ is the last business day of month i, it can be written:

$$TR_t^i = TR_{t_2}^j \quad \text{(Eq. 4.2)}$$

For a specific mortgage pool, the pay down for month i is preferably determined by the actual loans represented in the pool during month i–1. Therefore, two separate pools with the same characteristics can have different total returns.

In the preferred embodiment of the present invention, the Index represents generic pass-throughs, that is, pass-throughs representative of all pools of the same coupon, and original term, issued by the same agency. The total return of a generic pass-through is a weighted average of all of the pass-throughs it represents.

For month i, the factor of the generic pass-through with coupon c, original term t, issued by agency a may be determined by the following algorithm. First the working set is defined as all MBS pools issued by the agency a, of original term t, with fixed coupon c as of the first of month i. With this set, the maximum WALA (Weighted Average Loan Age) for TBA pools will be defined as:

$$n_{cutoff} = \min\left\{n : \frac{\text{principle of pools with } WALA \leq n}{\text{principle of all pools}} \geq 2.5\%\right\},$$

with all numbers as of the first of month i+1, then the subset of TBA pools will be $A = \{\text{pools: } WALA \leq n_{cutoff} \text{ as of the first of the month } i+1\}$.

Using this set the pay-down factor of month i is calculated as:

$$f_i = \frac{\sum_{\alpha \in A} \rho_{\alpha,i} - \sum_{\alpha \in A} \rho_{\alpha,i+1}}{\sum_{\alpha \in A} \rho_{\alpha,i}} \quad \text{(Eq. 4.3)}$$

with $\rho_{\alpha,i}$ as the principal outstanding of pool $\alpha$ as of the first of month i. If the WALA of a pool is unknown, it is estimated using CAGE. $f_i$ is the generic pay-down factor for the month i. Equation 4.3 creates a sequence of monthly pay-down factors for each generic pass-through. For a specific date t in month i, the pay-down factor of a generic pass-through as best known by t is preferably denoted $f_t$. The value $f_t$ is preferably the latest factor that would be known as of the close of t. For example if $f_i$ is known by t, then $f_t$ is defined as $f_i$. Or else, if $f_{i-1}$ is known by t, then the $f_t$ is defined to be $f_{i-1}$. Alternatively, the $f_t$ will be defined as $f_{i-2}$. The advantage of the above definition of $f_t$ is that it makes the Index independent of subjective prepayment models. Data related to each term found in Equation 4.3 is preferably input into the system so that the above calculations may be performed.

As described above, the provided formulas for calculating the total return of the Index is based on the same-day settle price, not standard PSA settle price. As shown for example in FIG. 3, the Bond Market Association announces the MBS settlement dates on which all purchasing transactions have to be settled. However, if the formula for calculating the total return of each generic pass-through is based on this TBA (or PSA) price, the calculation will necessarily include some element of estimating future cash flows. Consequently, in accordance with the preferred embodiment of the present invention, the formulas for converting from standard PSA settle prices to same-day settle prices are provided. As explained above, standard PSA settle price is the market observed price. Equations 5.1-5.5 provide: formulas for converting the standard PSA settle price, 1-month forward, to the same-day settle price. Data related to each term found in Equations 5.1-5.5 is preferably input into the system so that the above calculations may be performed.

There are two major differences between quoting prices with standard PSA settle and with same-day settle. First, standard PSA settle assumes that, while the price is agreed upon today, no payment is made until sometime in the future. Same-day settle requires payment today. Therefore a PSA settle price includes some time value that must be discounted to convert to today's dollars. Second, pass-throughs begin paying principal and interest to the bondholder the month following settlement. Therefore, purchasing securities 1-month forward standard PSA settle entitles the buyer to the pay down two months after the purchase day and not the pay down one month after the purchase date. For same-day settle the buyer is entitled to both of these pay downs.

Let $\tilde{p}$ represent the standard PSA settle price for a given TBA pass-through on a given date. The dirty price of that security (actual number of dollars expected for $1 of principal) is, $$\tilde{p} + \frac{c}{12}\frac{d_1}{360} \quad \text{(Eq. 5.1)}$$

where c represents the coupon of the pass-through expressed as a decimal (e.g. 7% implies c=0.07), $d_1$ represents the number of days into the month that 1-month forward standard PSA settle occurs. For example, if the standard PSA settlement for June 2000 is the 13th, then for any date in May 2000, $d_1$=12.

Discounting this price to the day in question, the following formula is derived:

$$\frac{\tilde{p} + \frac{c}{12}\frac{d_1}{360}}{1 + r\frac{d_2}{360}}, \quad \text{(Eq. 5.2)}$$

where r represents the discount funding rate; and $d_2$ represents the number of days in between the purchase date and the standard PSA settle date 1-month forward inclusive of the former and exclusive of the latter. The rate is quoted as a decimal, e.g. a rate of 6.5 percent is written as 0.065.

The value of the pay down and interest for the month following the purchases date is the sum of the two payments (discounted), $$\frac{(1-f_t) + \frac{c}{12}}{1 + r\frac{d_3}{360}}, \quad \text{(Eq. 5.3)}$$

with f representing the factor (derived from Equation 4.3) for that bond for that month. In the above equation, $d_3$ represents the number of days between the purchase date and the 25th of the next month (for FNMA MBS) or the 15th of the next month (for GNMA or FHLMC MBS), inclusive of the former and exclusive of the latter.

Assuming business day t falls in month i, the same-day settle price for a pass-through at the close of business on t, denoted by $p_t$, can be calculated by combining (5.2) and (5.3) ((5.2) is modified because (5.3) represents some of the principal). The following equation is then derived:

$$p_t = \frac{\tilde{p}_t + \frac{c}{12}\frac{d_1}{30}}{1 + r\frac{d_2}{360}}f_t + \frac{(1-f_t) + \frac{c}{12}}{1 + r\frac{d_3}{360}}, \quad \text{(Eq. 5.4)}$$

with $\tilde{p}_t$ being the TBA price of a pass-through 1-month forward standard PSA settle on the close of business on t, as quoted for example by the CSFB Pass-Through desk. The pay-down factor of the pass-through as best determined by t, $f_t$, is selected from the sequence of monthly pay-down factors derived from the Equation 4.3. In this preferred embodiment, r is a 1-month BBA LIBOR (British Bankers Association London Interbank Offered Rate) at the close of date t, if t is the last business day of the month. If not, then r is 1-month BBA LIBOR at the close of the last business day of month i−1. $d_1$ is the number of days between the first of month i+1 and the standard PSA settlement date in month i+1 inclusive of the later and exclusive of the former. The number of days between t and the standard PSA settlement date of month i+1 inclusive of the former and exclusive of the latter is shown in the (5.4) as $d_2$. For FNMA pass-throughs, $d_3$ is the number of days between the 25th of month i+1 and t inclusive of the former and exclusive of the latter. For GNMA and FHLMC pass-throughs, $d_3$ is the number of days between the 15th of the month i+1 and date t, inclusive of the former and exclusive of the latter. The values $\tilde{p}_t$, $r_t$, and c are often quoted as percents, however, in (5.4) they are all decimals. The source of 1-month BBA LIBOR is Reuters, and is defined in BRITISH BANKERS' ASSOCIATION (2000) Libor Official Definition (incorporated herein by reference). The BBA LIBOR and its definition may also be found at www.BBA.ORG.UK. The source of the PSA settlement dates is The Bond Market Association and may be obtained from www.bondmarket.com, as shown for example in FIG. 3.

When t is the last business day of the month i−1:

$$p_t = p_i, \quad \text{Eq. 5.5}$$

In accordance with the preferred embodiment of the present invention, each index may be characterized by its level. The level of the Index is defined by Equations 6.2 and 6.3 and is calculated in step 20 in FIG. 4. It should be noted that level determination is not a required step of the present invention, and any other tool known in the art may be used with the provided MBS Index to evaluate its performance.

In accordance with the preferred embodiment, the starting date of the index is input into the system. Equation 6.2 sets a starting level for this chosen starting date. Equation 6.3 sets the percent level change between two days to be the total return of the Index between those two days. The total return of the Index is determined from the Equations 2.1, 2.2 or 2.3 above.

The level is a useful tool for evaluating an investment in the Index. Assuming monthly reinvestment in the Index, a cash investment of $X on the date $t_1$ will show either a profit or a loss by a latter date $t_2$ such that $$\$XP_{t_2} - \frac{P_{t_1}}{P_{t_1}}, \quad \text{(Eq. 6.1)}$$

where $P_t$ is the level of the Index on day t. Of course, the investor's true total return will depend on how the monthly payments are reinvested.

If on the close of 12/31/93 the initial level of the Index is defined as:

$$P_{12/31/93} = 100 \quad \text{(Eq. 6.2)},$$

then on the close of any subsequent date t the level will be $$\frac{P_t}{P_{12/31/93}} = 1 + TR|_{12/31/93}^t, \quad \text{(Eq. 6.3)}$$

where $TR|_{12/13/93}^t$ is the total return of the Index from the close of 12/31/93 until the close of t. Over time movements in the levels are determined by the total return of the indices. Of course, the date 12/31/93 is selected arbitrarily and may be substituted by the actual start date of the index.

In accordance with the preferred embodiment of the present invention, a system 50 for generating and managing an MBS Index is provided to perform the above described method. FIG. 2 is a functional block diagram of an embodiment of the invention showing discrete components and information flow within the system 50. To accomplishe the described steps of the algorithm 10, system 50 preferably comprises a market data input device 26 (which may include an input/output interface 2 and input device 3, as shown in FIG. 1) for imputing necessary data related to outstanding mortgage-backed securities. Such data will include original term, coupon value, issuing agency, and outstanding principal on each outstanding mortgage-backed security. Additional data inputs into the system 50 through the market data input 26 preferably include TBA settle prices, PSA settle dates and BBA LIBOR rates.

The input data received by the system from the input 26 is preferably classified in the classification processor 28. The classification processor 28, which may be part of the CPU 1 shown in FIG. 1, classifies all outstanding mortgage-backed securities in accordance with their original term, coupon value, and issuing agency. Classified securities are then aggregated into pools in accordance with their coupon and original term. The data and composition of all aggregated pools are then outputted from the classification processor into the central hub 24. As will be obvious to one of ordinary skill in the art, it is not necessary to include the central hub 24 into the system 50, and all described data transfers may be accomplished by directly connecting the discrete components of the system to each other. Input processors 28-42 of FIG. 2 may all be included in the single CPU 1 of FIG. 1.

The central hub 24 is preferably connected to an Index database 44 for storing data related to the provided MBS Index. The Index database 44 may also store some tentative data, for example results of intra-step calculations, for future use. Although shown as a single component in FIG. 2, the Index database may comprise several components, for example, RAM 5, shown in FIG. 1, a hard drive, a connected zip drive or a separate database server. Output of every discrete component of the system 50 is preferably input into the central hub 24 and is further transmitted into the Index database 44. Selected data stored in the Index database may be outputted to the output terminal 46. The output terminal may include or be connected to the input/output interface 6 and the output device 7 as shown in FIG. 1.

Figure 5:
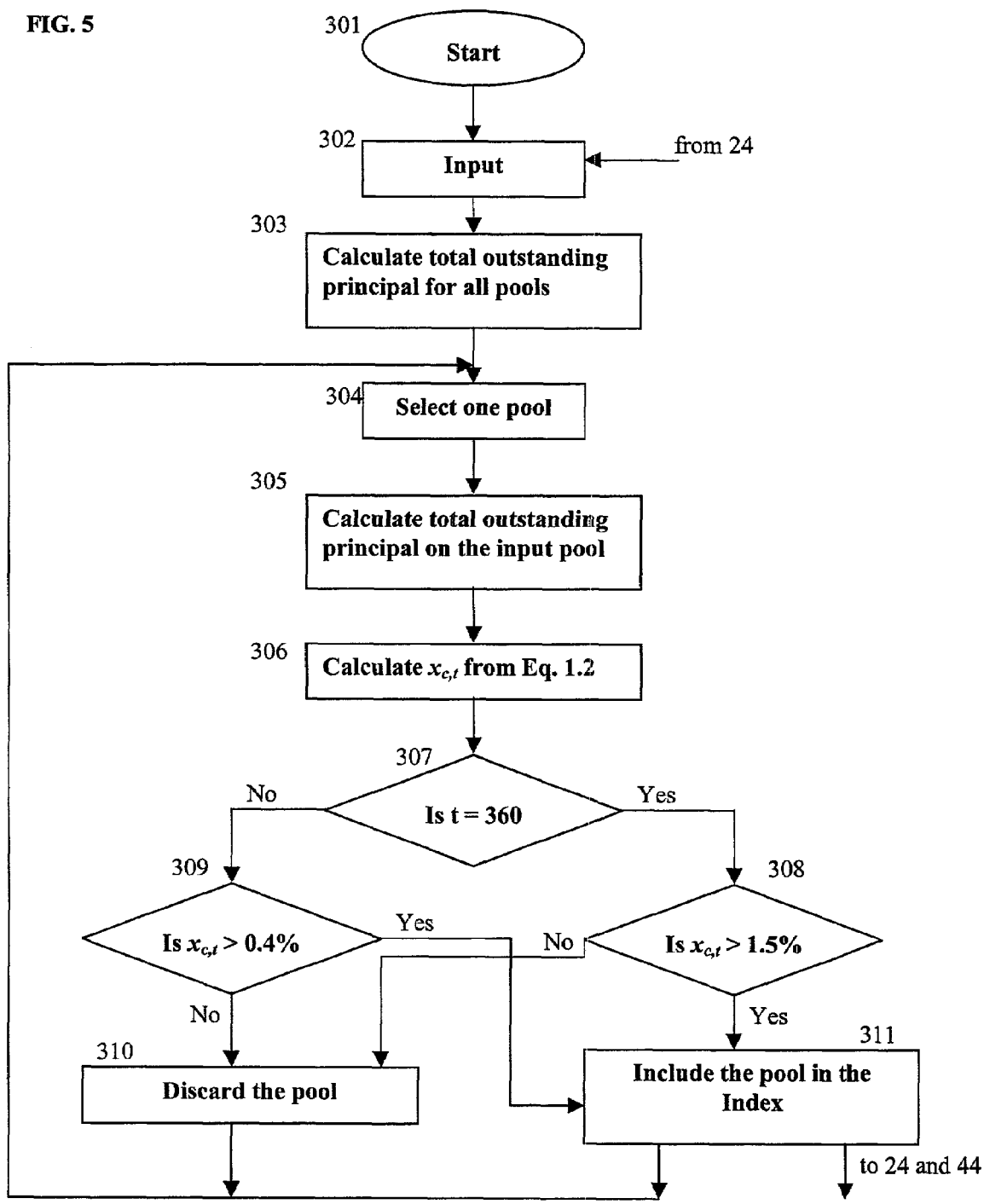
FIG. 5 is a logic flow chart of the processing logic for the index composition determination.

On the last business day of month i, the composition of all aggregated pools and other data related to these pools is input into an Index composition processor 30 from the central hub 24. The logic flow chart of the processing logic for the index composition determination is shown in FIG. 5. Logic conceptually begins at block 301 and proceeds to block 302 where the aggregated pools and their associated data are entered into the composition processor. At block 303, based on the input data, a total outstanding principal for all aggregated pools is calculated. One of the aggregated pools is selected for determination in block 304, and its outstanding principal is calculated in block 305. The results of calculations of blocks 303 and 305 are input into block 306, where the inclusion criterion is determined in accordance with Equation 1.2. At logic block 307, the processor will determine the original term of the pool selected in 304 and, if the original term is 30-years (360 months), the inclusion criterion $x_{c,t}$ is compared to 1.5% at logic block 308. If however, the original term is 15 years (180 months) the inclusion criterion is compared to 0.4% at logic block 309. Aggregated pools having a 30-year original term are included in the Index at block 311 if the expression at block 308 is determined to be true. Aggregated pools having a 15-year original term are included in the Index at block 311 if the expression at block 309 is determined to be true. Otherwise, the pool is discarded at block 310. After either the inclusion or exclusion of the pool selected in 304, the process is repeated from block 304 until all aggregated pools are considered. The Index composition, i.e., a list of all selected securities, is outputted into the central hub 24 and stored in the Index database 44, preferably with a month for which this Index was generated. As explained above, the composition of the Index will remain constant for one month. On the last business day of the next month the index composition processor is activated again and the selection process repeats.

Figure 6:
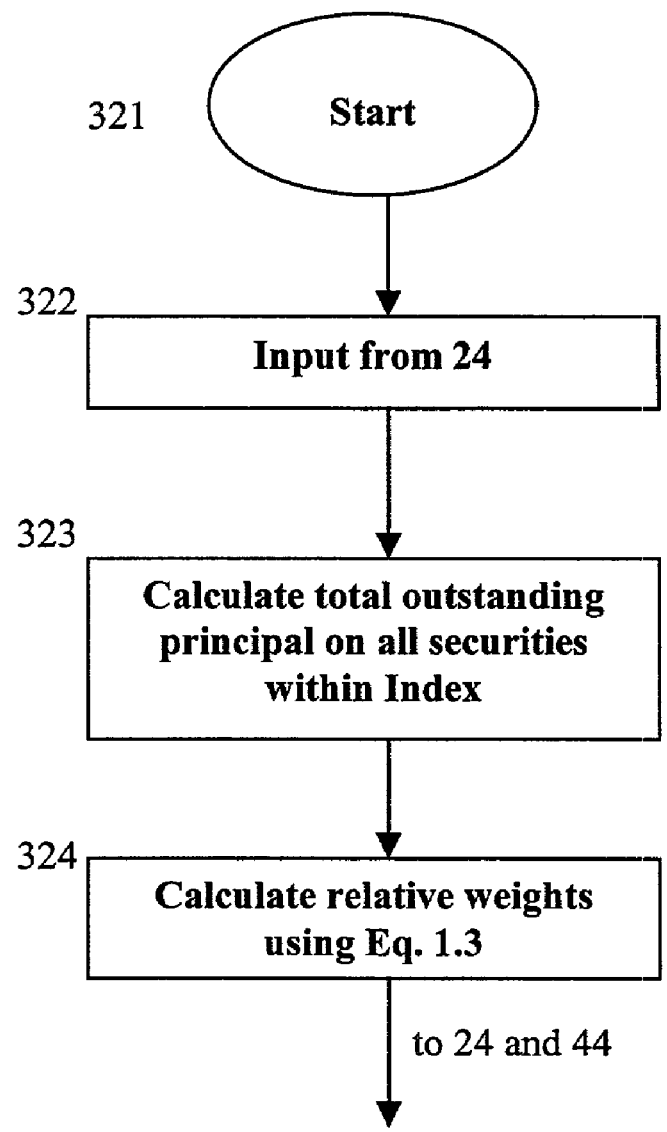
FIG. 6 is a logic flow chart of the processing logic for the relative weights calculation.

Relative weights of each mortgage-backed security included in the Index are preferably calculated in the weights processor 32, FIG. 2. The logic flow chart of the processing logic for the weights determination is shown in FIG. 6. Logic conceptually begins at block 321 and proceeds to input block 322 where the inclusion criteria from block 306 and total outstanding principal on each selected security from market data input 26 of FIG. 2 are entered into the weights processor. Total outstanding principal on all securities included in the Index is calculated at block 323, and the relative weight of each security is determined at block 324 using the Equation 1.3. The relative weights are outputted from the weights processor 32, input into the central hub 24 and preferably stored in the Index database 44.

In the preferred embodiment, the system 50 is also provided with a date calculator and internal calendar 38. As described above in connection with steps 16 and 18 of the algorithm 10, shown in FIG. 4, various dates and differences between them are used to calculate factor $f_t$, total return of each pass-through, total return of the Index, same-day-settle price and level of the Index. As would be obvious to one of ordinary skill in the art, these dates may be observed in the market and if the differences between them are required for further calculations, these differences can be determined within the individual processors, where these further calculations are to be performed. However, for purposes of efficiency it is preferred that the date on which each calculation is performed (also referred to in this disclosure as "the current date" and "$t_2$") is determined by the provided internal calendar. It is also preferred that all manipulations and calculations involving dates are made in the provided date calculator associated with the internal calendar. For example, instead of calculating the term d twice, as this term is required in the calculations of total return of each individual pass-through and same-day-settle price (in block 34 and block 42 of FIG. 2), it can be calculated once in the date calculator 38 and then input into blocks 34 and 42 when necessary.

Figure 7:
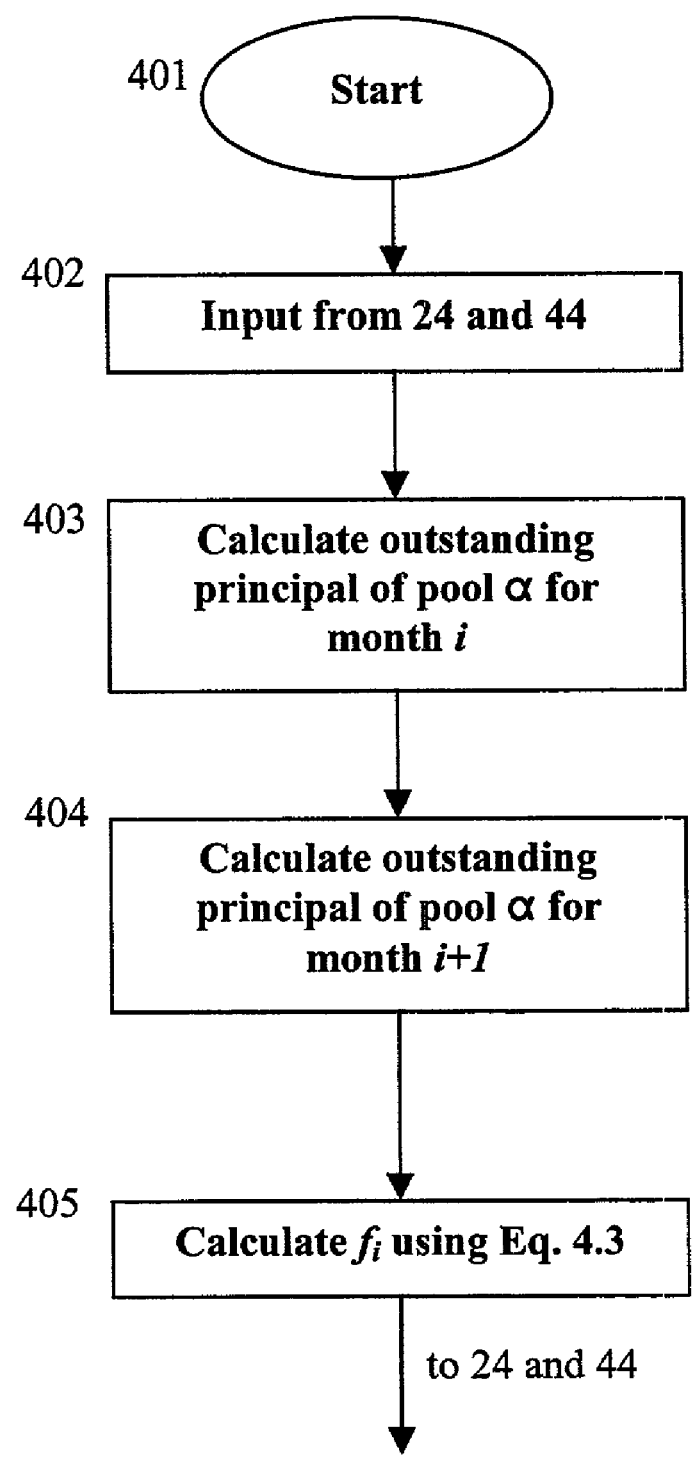
FIG. 7 is a logic flow chart of the processing logic for the pay-down factor determination.

Pay-down factor $f_i$ for each month is calculated in the factor processor 40 of FIG. 2. The logic flow chart of the processing logic for the factor determination is shown in FIG. 7. Logic conceptually begins at block 401 and proceeds to input block 402 where the total outstanding principal on each selected security is entered into the factor processor. The outstanding principal data may be input at 26 of FIG. 2 or may already be stored in the Index database 44 during performance of prior operations (e.g. steps 12 and 14 of FIG. 4). Principal outstanding of all securities within pool α for month i is calculated at block 403, and principal outstanding of all securities within pool α for month i+1 is calculated at block 404. These outstanding principals for two consecutive months are then input into the factor calculator 405, where the pay-down factor is determined in accordance with Equation 4.3. The pay-(town factor $f_i$ is outputted from the factor processor 40, input into the central hub 24 and stored in the Index database 44.

Figure 8:
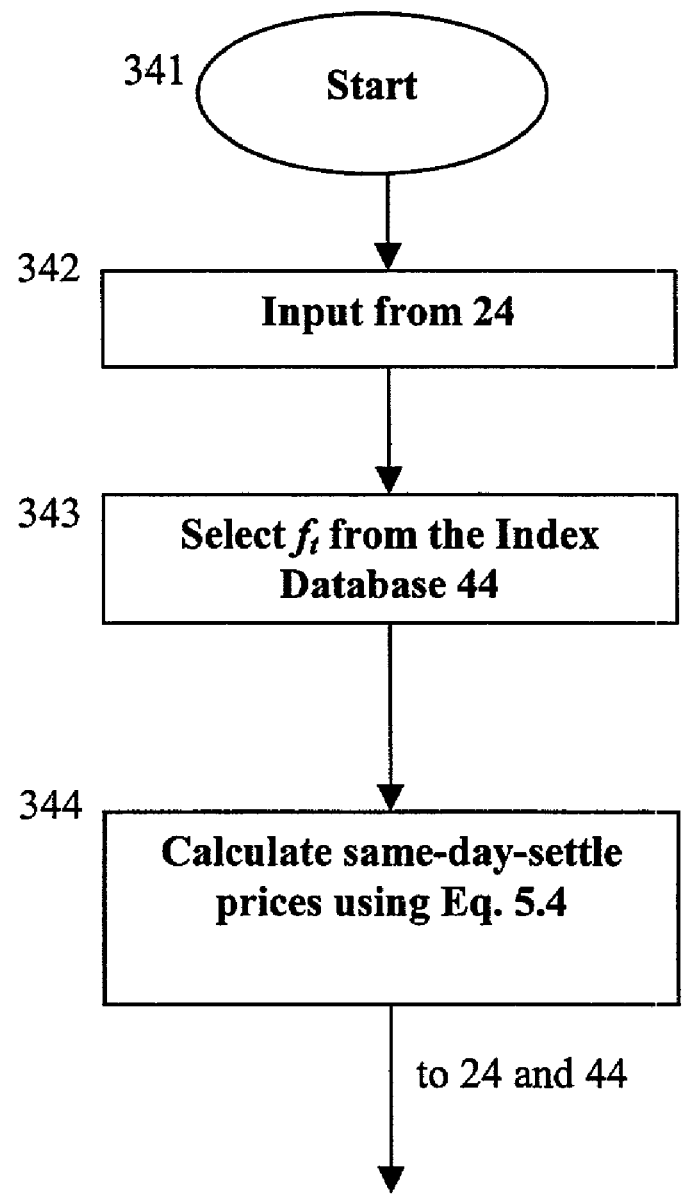
FIG. 8 is a logic flow chart of the processing logic for the same-day-settle price conversion.

Same-day-settle price for each security is calculated in the same-day-settle price processor 34 of FIG. 2. The logic flow chart of the processing logic for the determination of these prices is shown in FIG. 8. Logic conceptually begins at block 341 and proceeds to input block 342 where the 1-month BBA LIBOR, TBA price, and coupon value of each security included in the Index is entered into the same-day-settle price processor from the market data input 26 of FIG. 2. Additionally, date differences $d_1$, $d_2$ and $d_3$ are entered into the input block 342 from the date calculator 38. In block 343 the latest known pay-down factor $f_t$ is selected from the Index database 44 where all pay-down factors are stored. Using the input data, the same-day-settle price calculator 34 determines this price in accordance with Equation 5.4 in block 344. The same-day-settle price is outputted from its processor 34, input into the central hub 24 and stored in the Index database 44. The above described algorithm is repeated for every security included into the Index in the month of calculations.

Figure 9:
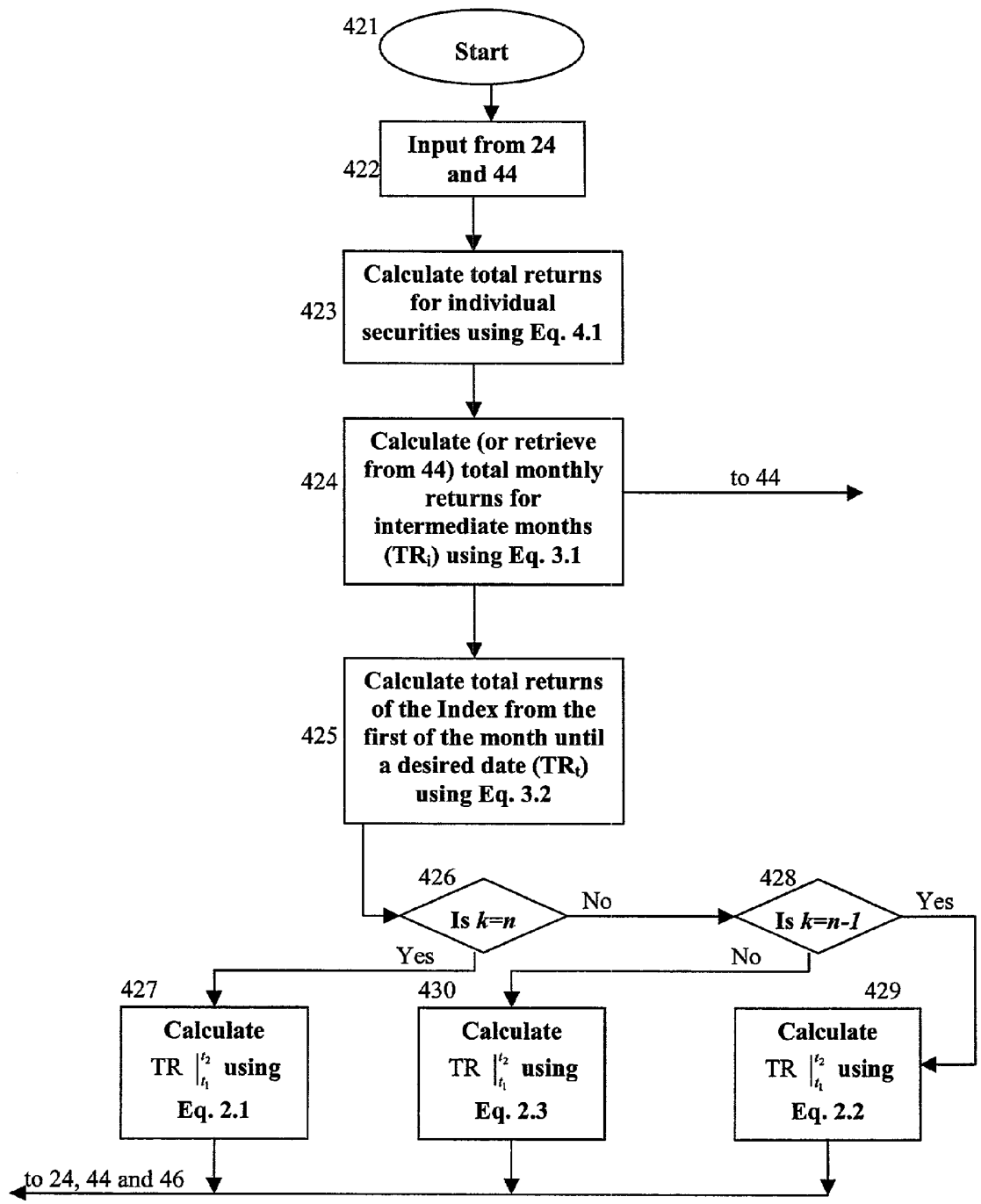
FIG. 9 is a logic flow chart of the processing logic for the determination of total return of the MBS Index.

Total return of the Index from the date $t_1$ of month k to date $t_2$ of month n is calculated in the total return processor 42 of FIG. 2. The logic flow chart of the processing logic for the total return determination is shown in FIG. 9. Logic conceptually begins at block 421 and proceeds to input block 422 where all necessary dates and differences between them are entered from block 38, coupon values and BBA LIBOR rates are entered from input 26 (or from the Index database 44 if these rates were previously stored there), same-day-settle prices are either entered from block 34 or retrieved from the database 44, the latest known pay-down factor is retrieved from the database 44, and the relative weights are either entered from block 32 or retrieved from the database 44. Total return of each individual pass-through in the Index is calculated at block 423 in accordance with Equation 4.1. Total returns of the Index for individual months ($TR_j$) are either calculated at block 424 in accordance with Equation 3.1 or retrieved from the database 44 if available, and total returns of the Index from the first of the month until a desired date (e.g. $t_1$ or $t_2$) within that month are calculated at block 425 in accordance with Equation 3.2. These calculated total returns are then input into the logic block 426. Total returns for individual months are preferably also outputted for storage in the database 44 so that they can be later retrieved from the database without repeating the above calculations. At logic block 426, the processor will determine the difference between the months k and n. If k and n are the same month (i.e., k=n), the total return of the index between $t_1$ and $t_2$ is calculated at block 427 according to Equation 2.1. If k and n are not the same, the system will proceed to logic block 428 where the system will determine whether k and n are consecutive months (i.e., k=n−1). If k and n are in fact consecutive, the processor will calculate the total return of the Index at block 429 using Equation 2.2. Alternatively, the processor will calculate the total return of the Index at block 430 using Equation 2.3. The output of blocks 427, 429 and 430 is preferably input into the database 44 for storage. Additionally, in accordance with the preferred embodiment, a month-to-day total return of the Index is outputted onto the output terminal 46 as a benchmark measuring the performance of the provided MBS Index.

System 50 is further provided with a level processor 36 where the level of the Index is determined in accordance with Equation 6.3. The starting level of the Index is preferably arbitrarily assigned, stored in the database 44 and retrieved for calculations by the level processor 36 when necessary. The total return for the life of the index may be calculated in the A total return processor 42 and input into the level processor 36. The resulting level of the Index is input into the central hub 24 and stored in the Index database 44. Additionally, in accordance with the preferred embodiment, a daily level of the Index is outputted onto the output terminal 46 as a benchmark measuring the performance of the provided MBS Index. Any other variable stored in the Index database 44 may also be displayed on the output terminal 46 if desired.

MBS Indices provided in accordance with the present invention may be used as a benchmark for objectively and accurately measuring the performance of the MBS sector of the market. The indices will preferably be published, or otherwise made available, on a monthly basis. The method provided by the present invention for generating MBS indices may be used by portfolio managers for creating index funds mirroring or reflecting the provided MBS indices. The algorithm may be encoded into a computer program and distributed to users on a CD-ROM or another readable storage device. Alternatively, this MBS index-generating program may be stored on a web server or an enterprise server and streamed, downloaded or otherwise provided to interested users on an as-needed basis. Since the composition of each index is preferably held constant throughout a month, fund managers avoid the need to match the provided benchmark's moves on a daily basis. Additionally, the provided system and method allow users to easily and automatically rebalance the index at or near the end of the month.

Having described this invention with regard to specific embodiments, it is to be understood that the description is not meant as a limitation since further variations or modifications may be apparent or may suggest themselves to those skilled in the art. For example, the provided method may easily be modified to generate other types of MBS indices. It is intended that the present application cover such variations and modifications as fall within the scope of the appended claims.

What is claimed is:

1. A method for managing a mortgage-backed securities index, comprising the steps of:
   a. selecting a set of mortgage-backed securities to be included in said mortgage-backed securities index, said set of mortgaged-backed securities being selected from all outstanding mortgage-backed securities;
   b. assigning a relative weight to each security within said selected set, said relative weight being a relative proportion of total outstanding principal on said each security to the total outstanding principal on all securities within said selected set;
   c. calculating a total return of said mortgage-backed securities index, said total return being based on said assigned relative weight for said each security, and a total return of said each security based on a same-day-settle price;
   d. storing the calculated total return of said mortgage-backed securities index in an index database;
   e. outputting the calculated total return of said mortgage-backed securities index to a user, wherein said step of selecting a set of mortgage-backed securities further comprises aggregating said all outstanding mortgage-backed securities into a plurality of pools, each of said pools comprising mortgage-backed securities having the same coupon and the same original term; and calculating an inclusion criteria for each pool within said plurality of pools, and wherein said inclusion criteria is given by the following equation:

$$x_{c,t} = \frac{\left[\sum_{a=\left\{\begin{array}{c}FNMA\\GNMA\\FHLMC\end{array}\right\}} \rho_{a,c,t}\right]}{\left[\sum_{\substack{a=FNMA,GNMA,FHLMC\\c \in Z\\t=180,360}} \rho_{a,c,t}\right]},$$

wherein $\rho_{a,c,t}$ is the total outstanding principal on said outstanding mortgage-backed securities,
   a is an agency which issued said outstanding mortgage-backed securities,
   c is a coupon value of said outstanding mortgage-backed securities, and
   t is an original term of said outstanding mortgage-backed securities.

2. A method for managing a mortgage-backed securities index according to claim 1, further comprising steps of comparing said inclusion criteria for a particular pool to a threshold value, and including said particular pool in said selected set if said threshold is met.

3. A method for managing a mortgage-backed securities index according to claim 2, wherein said threshold value is 1.5% for all 30-year mortgage-backed securities pools.

4. A method for managing a mortgage-backed securities index according to claim 2, wherein said threshold value is 0.4% for all 15-year mortgage-backed securities pools.

5. A method for managing a mortgage-backed securities index according to claim 1 wherein said relative weight of said each security within said selected set is given by the following equation:

$$w = \frac{\lfloor x_{c,t} \rho_{a,c,t} \rfloor}{\left[ \sum_{\substack{a=FNMA,GNMA,FHLMC \\ c \in Z \\ t=180,360}} \rho_{a,c,t} \right]}.$$

6. A method for managing a mortgage-backed securities index according to claim 5, wherein said total return of said each security within said selected set on any given day $t_2$ is given by the following equation:

$$TR_{t_2}^j = \frac{-p_{t_1} + f_{t_1} p_{t_2} + \left[(1-f_{t_1}) + \frac{c}{12}\right]\left[1 + r_{t_1} \frac{|d|}{360}\right]^{-k}}{p_{t_1}},$$

wherein $p_{t_1}$ is a same-day settle price of said each security on the close of day $t_1$, wherein $p_{t_2}$ is a same-day settle price of said each security on the close of day $t_2$, wherein $r_{t_1}$ is a one-month BBA LIBOR on the close of day $t_1$, wherein $f_{t_1}$ is a monthly pay-down factor of said each security as best determined by day $t_1$, said monthly pay-down factor $f_{t_1}$ being selected from a sequence of monthly pay-down factors $f_i$, $t_1$ is the last business day of the preceding month, $t_2$ is any day of the current month, and wherein 7. A method for managing a mortgage-backed securities index according to claim 6, wherein said sequence of monthly pay-down factors is given by the following equation:

$$f_i = \frac{\sum_{a \circ \in A} \rho_{\alpha,i} - \sum_{a \circ \in A} \rho_{\alpha,i+1}}{\sum_{a \circ \in A} \rho_{\alpha,i}},$$

wherein $\rho_{\alpha,i}$ is the principal outstanding of pool $\alpha$ as of the first of month i, and wherein $\rho_{\alpha,i+1}$ is the principal outstanding of pool $\alpha$ as of the first of month i+1.

8. A method for managing a mortgage-backed securities index according to claim 7 wherein said same-day settle price is given by the following equation:

$$p_t = \frac{\tilde{p}_t + \frac{c}{12}\frac{d_1}{30}}{1 + r\frac{d_2}{360}} f_t + \frac{(1-f_t) + \frac{c}{12}}{1 + r\frac{d_3}{360}},$$

wherein $\tilde{p}_t$ is the TBA price of said security 1-month forward standard PSA settle on the close of business on day t; wherein $d_1$ is the number of days into the month that 1-month forward standard PSA settle occurs; wherein $d_2$ is the number of days in between the purchase date and the standard PSA settle date 1-month forward inclusive of the former and exclusive of the latter; wherein, for FNMA mortgage-backed securities, $d_3$ is the number of days between the purchase date and the 25th of the next month; wherein for GNMA or FHLMC mortgage-backed securities, $d_3$ is the number of days between the purchase date and the 15th of the next month; and wherein r is a one-month BBA LIBOR on the close of day t.

9. A method for managing a mortgage-backed securities index according to claim 8 wherein said total return of said index from day $t_1$ in month k to day $t_2$ in month n is given by the following equation:

$$d = \begin{cases} 25 - \text{day of the month of } t_2, \text{ if said security is issued by } FNMA \\ \\ 15 - \text{day of the month of } t_2, \text{ if said security is issued by } GNMA \text{ or } FHLMC \end{cases}$$

and $$k = \begin{cases} +1, & \text{if } d > 0 \\ \\ -1, & \text{if } d < 0. \end{cases}$$

$$TR\big|_{t_1}^{t_2} = (1 + TR_k - TR_{t_1}) \left[ \prod_{i=k+1}^{n-1} (1 + TR_i) \right] (1 + TR_{t_2}) - 1,$$

$TR_{t_1}$ is the month-to-date total return of said index on the day $t_1$ and $TR_{t_2}$ the moth-to-date total return of said index on the day $t_2$, wherein $TR_k$ is the total return of the index for the month k, and wherein $TR_i$ is the total return of the index for any intermediate month between k and n.

10. A method for managing a mortgage-backed securities index according to claim 9 wherein said total return of the index for any intermediate month is given by the following equation:

$$TR_i = \frac{\sum_{j=1}^{n} w_i^j p_{ii}^j TR_i^j}{\sum_{j=1}^{n} w_i^j p_i^j},$$

wherein said total returns of said index on the day $t_1$ and $t_2$ are given by the following equation:

$$TR_t = \frac{\sum_{j=1}^{n} w_i^j p_i^j TR_t^j}{\sum_{j=1}^{n} w_i^j p_i^j},$$

wherein $\{w_i^j\}_{j=1}^n$ are the relative weights of said mortgage-backed securities within said index, and wherein $p_i^j$ is the same-day settle price for said each security within said index.

11. A method for managing a mortgage-backed securities index according to claim 10, further comprising a step of determining a level of said mortgage-backed securities index, said level being given by the following equation:

$$\frac{P_t}{P_{00/00/00}} = 1 + TR\big|_{00/00/00}^t,$$

wherein $P_{00/00/00}$ is the starting level of said index, wherein $TR|_{00/00/00}$ is the total return of said index from start to the day t, and wherein $P_t$ is the current level of the index.

12. A method for managing a mortgage-backed securities index according to claim 11, wherein said starting level of said index is 100.

13. A method for managing a mortgage-backed securities index according to claim 1, further comprising a step of rebalancing said index by repeating said steps of selecting a set of mortgage-backed securities to be included in said mortgage-backed securities index, assigning said relative weight to each security within said selected set, and calculating said total return of said mortgage-backed securities index.

14. A system for managing a mortgage-backed securities index, comprising:
an input device for inputting market data into said system, said market data comprising data for all outstanding mortgage-backed securities;
a processor operating under a set of instructions recorded on a processor-readable medium, the set of instructions including
a first set of instructions configured to select a set of mortgage-backed securities to be included in said mortgage-backed securities index, said set of mortgaged-backed securities being selected from said all outstanding mortgage-backed securities;
a second set of instructions configured to assign a relative weight to each security within said selected set, said relative weight being a relative proportion of total outstanding principal on said each security to a total outstanding principal on all securities within said selected set; and
a third set of instructions configured to calculate a total return of said mortgage-backed securities index, said total return being calculated based on said assigned relative weight of said each security within said selected set, and a total return of said each security within said selected set based on a same-day-settle price;
an index database storing the calculated total return of said mortgage-backed securities index; and
an output device outputting the calculated total return of said mortgage-backed securities index to a user
wherein first set of instructions further comprises instructions configured to calculate an inclusion criterion for each of said aggregated pools, and wherein said inclusion criterion is given by the following equation:

$$x_{c,t} = \frac{\left[ \sum_{a=\left\{\begin{array}{c}FNMA\\GNMA\\FHLMC\end{array}\right\}} \rho_{a,c,t} \right]}{\left[ \sum_{\substack{a=FNMA,GNMA,FHLMC\\c\in Z\\t=180,360}} \rho_{a,c,t} \right]}$$

wherein $\rho_{a,c,t}$ is the total outstanding principal on said outstanding mortgage-backed securities,
a is an agency which issued said outstanding mortgage-backed securities,
c is a coupon value of said outstanding mortgage-backed securities, and
t is an original term of said outstanding mortgage-backed securities.

15. A system for managing a mortgage-backed securities index according to claim 14 further comprising a storage device, said storage device storing data circulated within said system.

16. A system for managing a mortgage-backed securities index according to claim 14, wherein said set of instructions further includes a fourth set of instructions configured to classify said data for all outstanding mortgage-backed securities in accordance with a coupon value, issuing agency and original term of each of said outstanding mortgage-backed securities.

17. A system for managing a mortgage-backed securities index according to claim 14, wherein said set of instructions further includes a fifth set of instructions configured to aggregate said outstanding mortgage-backed securities into a plurality of aggregated pools.

18. A system for managing a mortgage-backed securities index according to claim 14, wherein said set of instructions further includes a sixth set of instructions configured to compare said inclusion criterion for all of said aggregated pools to a threshold value, and to include an aggregated pool in said selected set if said threshold is met.

19. A system for managing a mortgage-backed securities index according to claim 18, wherein said threshold value is 1.5% for all 30-year mortgage-backed securities pools.

20. A system for managing a mortgage-backed securities index according to claim 18, wherein said threshold value is 0.4% for all 15-year mortgage-backed securities pools.

21. A system for managing a mortgage-backed securities index according to claim 14 wherein said relative weight of said each security within said selected set is given by the following equation:

$$w = \frac{\lfloor x_{c,t} \rho_{a,c,t} \rfloor}{\left[ \sum_{\substack{a=FNMA,GNMA,FHLMC \\ c \in Z \\ t=180,360}} \rho_{a,c,t} \right]},$$

wherein w is said relative weight of said each security within said selected set.

22. A system for managing a mortgage-backed securities index according to claim 14 wherein said third set of instructions further comprises instructions configured to calculate said total return of said each security within said selected set.

23. A system for managing a mortgage-backed securities index according to claim 22 wherein said instructions configured to calculate said total return of said each security calculate said total return of said each security within said selected set on any given day $t_2$ in accordance with the following equation:

$$TR_{t_2}^j = \frac{-p_{t_1} + f_{t_1} p_{t_2} + \left[(1-f_{t_1}) + \frac{c}{12}\right]\left[1 + r_{t_1} \frac{|d|}{360}\right]^{-k}}{p_{t_1}},$$

wherein $p_{t_1}$ is a same-day settle price of said each security on the close of day $t_1$, wherein $p_{t_2}$ is a sameday settle price of said each security on the close of day $t_2$, wherein $r_{t_1}$ is a one-month BBA LIBOR on the close of day $t_1$, wherein $f_{t_1}$ is a monthly pay-down factor of said each security as best determined by day $t_1$, said monthly pay-down factor $f_{t_1}$ being selected from a sequence of monthly pay-down factors $f_i$, $t_1$ is the last business day of the preceding month, $t_2$ is any day of the current month, and wherein $d =$ $\begin{cases} 25 - \text{day of the month of } t_2, \text{ if said each security is issued by } FNMA \\ \\ 15 - \text{day of the month of } t_2, \text{ if said each security is issued by } GNMA \text{ or } FHLMC \end{cases}$ and $k = \begin{cases} +1, & \text{if } d > 0 \\ \\ -1, & \text{if } d < 0. \end{cases}$ 24. A system for managing a mortgage-backed securities index according to claim 23, wherein said sequence of monthly pay-down factors is given by the following equation:

$$f_i = \frac{\sum_{a o \in A} \rho_{\alpha,i} - \sum_{a o \in A} \rho_{\alpha,i+1}}{\sum_{a o \in A} \rho_{\alpha,i}},$$

wherein $\rho_{\alpha,i}$ is the principal outstanding of pool $\alpha$ as of the first of month i, and wherein $\rho_{\alpha,i+1}$ is the principal outstanding of pool $\alpha$ as of the first of month i+1.

25. A system for managing a mortgage-backed securities index according to claim 14, wherein said same-day settle price is given by the following equation:

$$p_t = \frac{\tilde{p}_t + \frac{c}{12}\frac{d_1}{30}}{1 + r\frac{d_2}{360}} f_t + \frac{(1-f_t) + \frac{c}{12}}{1 + r\frac{d_3}{360}},$$

wherein $\tilde{p}_t$ is the TBA price of said security 1-month forward standard PSA settle on the close of business on day t; wherein $d_1$ is the number of days into the month that 1-month forward standard PSA settle occurs; wherein $d_2$ is the number of days in between the purchase date and the standard PSA settle date 1-month forward inclusive of the former and exclusive of the latter; wherein, for FNMA mortgage-backed securities, $d_3$ is the number of days between the purchase date and the 25th of the next month; wherein for GNMA or FHLMC mortgage-backed securities, $d_3$ is the number of days between the purchase date and the 15th of the next month; and wherein r is a one-month BBA LIBOR on the close of day t.

26. A system for managing a mortgage-backed securities index according to claim 14 wherein said total return of said index from day $t_1$ in month k to day $t_2$ in month n is given by the following equation:

$$TR|_{t_1}^{t_2} = (1 + TR_k - TR_{t_1})\left[\prod_{i=k+1}^{n-1}(1+TR_i)\right](1+TR_{t_2}) - 1$$

when k<n−1, wherein $TR_{t_1}$ is the month-to-date total return of said index on the day $t_1$, and $TR_{t_2}$ is the month-to-date total return of said index on the day $t_2$, wherein $TR_k$ is the total return of the index for the month k, and wherein $TR_i$ is the total return of the index for any intermediate month between k and n.

27. A system for managing a mortgage-backed securities index according to claim 26 wherein said total return of the index for any intermediate month is given by the following equation:

$$TR_i = \frac{\sum_{j=1}^{n} w_i^j p_{ii}^j TR_i^j}{\sum_{j=1}^{n} w_i^j p_i^j},$$

wherein said total returns of said index on the day $t_1$ and $t_2$ are given by the following equation:

$$TR_t = \frac{\sum_{j=1}^{n} w_i^j p_i^j TR_t^j}{\sum_{j=1}^{n} w_i^j p_i^j},$$

wherein $$\{w_i^j\}_{j=1}^{n}$$

are the relative weights of said mortgage-backed securities within said index, and wherein $p_i^j$ is the same-day settle price for said each security within said index.

28. A system for managing a mortgage-backed securities index according to claim 14 wherein said total return of said index from day $t_1$ in month k to day $t_2$ in month n is given by the following equation:

$$TR|_{t_1}^{t_2} = TR_{t_2} - TR_{t_1}$$

when k=n, wherein $TR_{t_1}$ is the total return of said index on the day $t_1$, and $TR_{t_2}$ is the total return of said index on the day $t_2$.

29. A system for managing a mortgage-backed securities index according to claim 14 wherein said total return of said index from day $t_1$ in month k to day $t_2$ in month n is given by the following equation:

$$TR|_{t_1}^{t_2} = (1 + TR_k - TR_{t_1})(1 + TR_{t_2}) - 1$$

when k=n−1, wherein $TR_{t_1}$ is the total return of said index on the day $t_1$, wherein $TR_{t_2}$ is the total return of said index on the day $t_2$, and wherein $TR_k$ is the total return of the index for the month k.

30. A system for managing a mortgage-backed securities index according to claim 14, wherein the set of instructions further comprises a seventh set of instructions configured to determine a level of said mortgage-backed securities index.

31. A system for managing a mortgage-backed securities index according to claim 30 wherein said level is given by the following equation:

$$\frac{P_t}{P_{00/00/00}} = 1 + TR|_{00/00/00}^{t},$$

wherein $P_t$ is said level of said mortgage-backed securities index on the day t, wherein $P_{00/00/00}$ is a starting level of said index, and wherein $TR|_{00/00/00}^{t}$ is the total return of said index from the starting date to the day t.

32. A system for managing a mortgage-backed securities index according to claim 31, wherein said starting level of said index is 100.

33. A mortgage-backed securities index comprising:

a set of mortgage-backed securities, said set of mortgaged-backed securities being selected from all outstanding mortgage-backed securities; wherein a relative weight is assigned to each security within said selected set, said relative weight being a relative proportion of total outstanding principal on said each security to the total outstanding principal on all securities within said selected set, and wherein said mortgage-backed securities index is characterized by a total return of said mortgage-backed securities index, said total return being calculated based on said assigned relative weight for said each security, and a total return of said each security based on a same-day-settle price, wherein said selected set of mortgage-backed securities is selected by aggregating said all outstanding mortgage-backed securities into a plurality of pools, each of said pools comprising mortgage-backed securities having the same coupon and the same original term; and calculating an inclusion criteria for each pool within said plurality of pools, and wherein said inclusion criteria is given by the following equation:

$$x_{c,t} = \frac{\left[\sum_{a=\{\substack{FNMA \\ GNMA \\ FHLMC}\}} \rho_{a,c,t}\right]}{\left[\sum_{\substack{a=FNMA,GNMA,FHLMC \\ c \in Z \\ t=180,360}} \rho_{a,c,t}\right]}$$

wherein $\rho_{a,c,t}$ is the total outstanding principal on said outstanding mortgage-backed securities, a is an agency which issued said outstanding mortgage-backed securities, c is a coupon value of said outstanding mortgage-backed securities, and t is an original term of said outstanding mortgage-backed securities.

34. A mortgage-backed securities index according to claim 33, wherein if said inclusion criteria for a particular pool is greater than a threshold value, said particular pool is included in said selected set.

35. A mortgage-backed securities index according to claim 34, wherein said threshold value is 1.5% for all 30-year mortgage-backed securities pools.

36. A mortgage-backed securities index according to claim 34, wherein said threshold value is 0.4% for all 15-year mortgage-backed securities pools.

37. A mortgage-backed securities index according to claim 33 wherein said relative weight of said each security within said selected set is given by the following equation:

$$w = \frac{[x_{c,t}\rho_{a,c,t}]}{\left[\sum_{\substack{a=FNMA,GNMA,FHLMC \\ c \in Z \\ t=180,360}} \rho_{a,c,t}\right]}.$$

38. A mortgage-backed securities index according to claim 37, wherein said total return of said each security within said selected set on any given day $t_2$ is given by the following equation:

$$TR_{t_2}^j = \frac{-p_{t_1} + f_{t_1}p_{t_2} + \left[(1-f_{t_1}) + \frac{c}{12}\right]\left[1 + r_{t_1}\frac{|d|}{360}\right]^{-k}}{p_{t_1}},$$

wherein $p_{t_1}$ is a same-day settle price of said each security on the close of day $t_1$, wherein $p_{t_2}$ is a same-day settle price of said each security on the close of day $t_2$, wherein $r_{t_1}$ a one-month BBA LIBOR on the close of day $t_1$, wherein $f_{t_1}$ is a monthly pay-down factor of said each security as best determined by day $t_1$, said monthly pay-down factor $f_{t_1}$ being selected from a sequence of monthly pay-down factors $f_i$, $t_1$ is the last business day of the preceding month, $t_2$ is any day of the current month, and wherein $$d = \begin{cases} 25 - \text{day of the month of } t_2, \text{ if said security is issued by } FNMA \\ \\ 15 - \text{day of the month of } t_2, \text{ if said security is issued by } GNMA \text{ or } FHLMC \end{cases}$$

and $$k = \begin{cases} +1, & \text{if } d > 0 \\ \\ -1, & \text{if } d < 0. \end{cases}$$

39. A mortgage-backed securities index according to claim 38, wherein said sequence of monthly pay-down factors is given by the following equation:

$$f_i = \frac{\sum_{\alpha o \in A}\rho_{\alpha,i} - \sum_{\alpha o \in A}\rho_{\alpha,i+1}}{\sum_{\alpha o \in A}\rho_{\alpha,i}},$$

wherein $\rho_{\alpha,i}$ is the principal outstanding of pool $\alpha$ as of the first of month i, and wherein $\rho_{\alpha,i+1}$ is the principal outstanding of pool $\alpha$ as of the first of month i+1.

40. A mortgage-backed securities index according to claim 39, wherein said same-day settle price is given by the following equation:

$$p_t = \frac{\tilde{p}_t + \frac{c}{12}\frac{d_1}{30}}{1 + r\frac{d_2}{360}}f_t + \frac{(1-f_t) + \frac{c}{12}}{1 + r\frac{d_3}{360}},$$

wherein $\tilde{p}_t$ is the TBA price of said security 1-month forward standard PSA settle on the close of business on day t; wherein $d_1$ is the number of days into the month that 1-month forward standard PSA settle occurs; wherein $d_2$ is the number of days in between the purchase date and the standard PSA settle date 1-month forward inclusive of the former and exclusive of the latter; wherein, for FNMA mortgage-backed securities, $d_3$ is the number of days between the purchase date and the 25th of the next month; wherein for GNMA or FHLMC mortgage-backed securities, $d_3$ is the number of days between the purchase date and the 15th of the next month; and wherein r is a one-month BBA LIBOR on the close of day t.

41. A mortgage-backed securities index according to claim 40, wherein said total return of said index from day $t_1$ in month k to day $t_2$ in month n is given by the following equation:

$$TR|_{t_1}^{t_2} = (1 + TR_k - TR_{t_1})\left[\prod_{i=k+1}^{n-1}(1 + TR_i)\right](1 + TR_{t_2}) - 1,$$

wherein $TR_{t_1}$ is the month-to-date total return of said index on the day $t_1$, and $TR_{t_2}$ is the moth-to-date total return of said index on the day $t_2$, wherein $TR_k$ is the total return of the index for the month k, and wherein $TR_i$ is the total return of the Index for any intermediate month between k and n.

42. A mortgage-backed securities index according to claim 41 wherein said total return of the index for any intermediate month is given by the following equation:

$$TR_i = \frac{\sum_{j=1}^{n}w_i^j p_{ii}^j TR_i^j}{\sum_{j=1}^{n}w_i^j p_i^j},$$

wherein said total returns of said index on the day $t_1$ and $t_2$ are given by the following equation:

$$TR_t = \frac{\sum_{j=1}^{n} w_i^j p_i^j TR_t^j}{\sum_{j=1}^{n} w_i^j p_i^j},$$

wherein $$\{w_i^j\}_{j=1}^{n}$$

are the relative weights of said mortgage-backed securities within said index, and wherein $p_i^j$ is the same-day settle price for said each security within said index.

43. A mortgage-backed securities index according to claim 42, wherein said index is further characterized by a level, said level being given by the following equation:

$$\frac{P_t}{P_{00/00/00}} = 1 + TR|_{00/00/00}^t,$$

wherein $P_{00/00/00}$ is the staffing level of said index, wherein $TR|_{00/00/00}^t$ is the total return of said index from start to the day t, and wherein $P_t$ is the current level of the index.

44. A mortgage-backed securities index according to claim 43, wherein said starting level of said index is 100.

45. A mortgage-backed securities index according to claim 33, wherein said index is rebalanced by of selecting a new set of mortgage-backed securities to be included in said mortgage-backed securities index, assigning said relative weight to each security within said new selected set, and calculating a new total return of said mortgage-backed securities index.

46. A mortgage-backed securities index according to claim 45 wherein said index is rebalanced on a last business day of each month.

47. A computer program for managing a mortgage-backed securities index recorded on a computer-readable medium and executable on a general purpose computer, comprising:
   an input segment for inputting market data into said system, said market data comprising data for all outstanding mortgage-backed securities;
   a selection segment for selecting a set of mortgage-backed securities to be included in said mortgage-backed securities index, said set of mortgaged-backed securities being selected from said all outstanding mortgage-backed securities;
   a weight segment for assigning a relative weight to each security within said selected set, said relative weight being a relative proportion of total outstanding principal on said each security to a total outstanding principal on all securities within said selected set; and
   a total return segment for calculating a total return of said mortgage-backed securities index, said total return being calculated based on said assigned relative weight of said each security within said selected set, and a total return of said each security within said selected set based on a same-day-settle price,
   wherein said selection segment further comprises a segment for calculating an inclusion criterion for each of said aggregated pools, and wherein said inclusion criterion is given by the following equation:

$$X_{c,t} = \frac{\left[\sum_{a=\begin{Bmatrix}FNMA\\GNMA\\FHLMC\end{Bmatrix}} \rho_{a,c,t}\right]}{\left[\sum_{\substack{a=FNMA,GNMA,FHLMC\\c\in Z\\t=180,360}} \rho_{a,c,t}\right]}$$

wherein $\rho_{a,c,t}$ is the total outstanding principal on said outstanding mortgage-backed securities,
   a is an agency which issued said outstanding mortgage-backed securities,
   c is a coupon value of said outstanding mortgage-backed securities, and
   t is an original term of said outstanding mortgage-backed securities.

48. A computer program for managing a mortgage-backed securities index according to claim 47 further comprising a storage segment, said storage segment storing data circulated within said system.

49. A computer program for managing a mortgage-backed securities index according to claim 47 further comprising a classification segment, said classification segment classifying said data for all outstanding mortgage-backed securities in accordance with a coupon value, issuing agency and original term of each of said outstanding mortgage-backed securities.

50. A computer program for managing a mortgage-backed securities index according to claim 47 further comprising an aggregation segment, said aggregation segment aggregating said outstanding mortgage-backed securities into a plurality of aggregated pools.

51. A computer program for managing a mortgage-backed securities index according to claim 47, further comprising a segment for comparing said inclusion criterion for all of said aggregated pools to a threshold value, and including an aggregated pool in said selected set if said threshold is met.

52. A computer program for managing a mortgage-backed securities index according to claim 51, wherein said threshold value is 1.5% for all 30-year mortgage-backed securities pools.

53. A computer program for managing a mortgage-backed securities index according to claim 51, wherein said threshold value is 0.4% for all 15-year mortgage-backed securities pools.

54. A computer program for managing a mortgage-backed securities index according to claim 47 wherein said relative weight of said each security within said selected set is given by the following equation:

$$w = \frac{\lfloor x_{c,t}\rho_{a,c,t}\rfloor}{\left[\sum_{\substack{a=FNMA,GNMA,FHLMC\\c\in Z\\t=180,360}} \rho_{a,c,t}\right]},$$

wherein w is said relative weight of said each security within said selected set.

55. A computer program for managing a mortgage-backed securities index according to claim 47 wherein said total return segment further comprises segment for calculating said total return of said each security within said selected set.

56. A computer program for managing a mortgage-backed securities index according to claim 55 wherein said segment for calculating calculates said total return of said each security within said selected set on any given day $t_2$ in accordance with the following equation:

$$TR_{t_2}^j = \frac{-p_{t_1} + f_{t_1} p_{t_2} + \left[(1-f_{t_1}) + \frac{c}{12}\right]\left[1 + r_{t_1} \frac{|d|}{360}\right]^{-k}}{p_{t_1}},$$

wherein $p_{t_1}$ is a same-day settle price of said each security on the close of day $t_1$, wherein $p_{t_2}$ is a sameday settle price of said each security on the close of day $t_2$, wherein $r_{t_1}$ is a one-month BBA LIBOR on the close of day $t_1$, wherein $f_{t_1}$ is a monthly pay-down factor of said each security as best determined by day $t_1$, said monthly pay-down factor $f_{t_1}$ being selected from a sequence of monthly pay-down factors $f_i$, $t_1$ is the last business day of the preceding month, $t_2$ is any day of the current month, and wherein $$d = \begin{cases} 25 - \text{day of the month of } t_2, \text{ if said each security is issued by } FNMA \\ \\ 15 - \text{day of the month of } t_2, \text{ if said each security is issued by } GNMA \text{ or } FHLMC \end{cases}$$

and $$k = \begin{cases} +1, & \text{if } d > 0 \\ \\ -1, & \text{if } d < 0. \end{cases}$$

57. A computer program for managing a mortgage-backed securities index according to claim 56, wherein said sequence of monthly pay-down factors is given by the following equation:

$$f_i = \frac{\sum_{\alpha\circ\in A} \rho_{\alpha,i} - \sum_{\alpha\circ\in A} \rho_{\alpha,i+1}}{\sum_{\alpha\circ\in A} \rho_{\alpha,i}},$$

wherein $\rho_{\alpha,i}$ is the principal outstanding of pool $\alpha$ as of the first of month i, and wherein $\rho_{\alpha,i+1}$ is the principal outstanding of pool $\alpha$ as of the first of month i+1.

58. A computer program for managing a mortgage-backed securities index according to claim 47, wherein said same-day settle price is given by the following equation:

$$p_t = \frac{\tilde{p}_t + \frac{c}{12}\frac{d_1}{30}}{1 + r\frac{d_2}{360}} f_t + \frac{(1-f_t) + \frac{c}{12}}{1 + r\frac{d_3}{360}},$$

wherein $\tilde{p}_t$ is the TBA price of said security 1-month forward standard PSA settle on the close of business on day t; wherein $d_1$ is the number of days into the month that 1-month forward standard PSA settle occurs; wherein $d_2$ is the number of days in between the purchase date and the standard PSA settle date 1-month forward inclusive of the former and exclusive of the latter; wherein, for FNMA mortgage-backed securities, $d_3$ is the number of days between the purchase date and the 25th of the next month; wherein for GNMA or FHLMC mortgage-backed securities, $d_3$ is the number of days between the purchase date and the 15th of the next month; and wherein r is a one-month BBA LIBOR on the close of day t.

59. A computer program for managing a mortgage-backed securities index according to claim 47 wherein said total return of said index from day $t_1$ in month k to day $t_2$ in month n is given by the following equation:

$$TR|_{t_1}^{t_2} = (1 + TR_k - TR_{t_1})\left[\prod_{i=k+1}^{n-1}(1 + TR_i)\right](1 + TR_{t_2}) - 1$$

when k<n31 1, wherein $TR_{t_1}$ is the month-to-date total return of said index on the day $t_1$, and $TR_{t_2}$ is the moth-to-date total return of said index on the day $t_2$, wherein $TR_k$ is the total return of the Index for the month k, and wherein $TR_i$ is the total return of the index for any intermediate month between k and n.

60. A computer program for managing a mortgage-backed securities index according to claim 59, wherein said total return of the index for any intermediate month is given by the following equation:

$$TR_i = \frac{\sum_{j=1}^{n} w_i^j p_{ii}^j TR_i^j}{\sum_{j=1}^{n} w_i^j p_i^j},$$

wherein said total returns of said index on the day $t_1$ and $t_2$ are given by the following equation:

$$TR_t = \frac{\sum_{j=1}^{n} w_i^j p_i^j TR_t^j}{\sum_{j=1}^{n} w_i^j p_i^j},$$

wherein $$\{w_i^j\}_{j=1}^n$$

are the relative weights of said mortgage-backed securities within said index, and wherein $p_i^j$ is the same-day settle price for said each security within said index.

61. A computer program for managing a mortgage-backed securities index according to claim 47 wherein said total return of said index from day $t_1$ in month k to day $t_2$ in month n is given by the following equation:

$$TR|_{t_1}^{t_2} = TR_{t_2} - TR_{t_1}$$

when k=n, wherein $TR_{t_1}$ is the total return of said index on the day $t_1$, and $TR_{t_2}$ is the total return of said index on the day $t_2$.

62. A computer program for managing a mortgage-backed securities index according to claim 47 wherein said total return of said index from day $t_1$ in month k to day $t_2$ in month n is given by the following equation:

$$TR|_{t_1}^{t_2} = (1 + TR_k - TR_{t_1})(1 + TR_{t_2}) - 1$$

when k=n−1, wherein $TR_{t_1}$ is the total return of said index on the day $t_1$, wherein $TR_{t_2}$ is the total return of said index on the day $t_2$ and wherein $TR_k$ is the total return of the index for the month k.

63. A computer program for managing a mortgage-backed securities index according to claim 47, further comprising level segment, said level segment determining a level of said mortgage-backed securities index.

64. A computer program for managing a mortgage-backed securities index according to claim 63 wherein said level is given by the following equation:

$$\frac{P_t}{P_{00/00/00}} = 1 + TR|_{00/00/00}^t,$$

wherein $P_t$ is said level of said mortgage-backed securities index on the day t, wherein $P_{00/00/00}$ is a starting level of said index, and wherein $TR|_{00/00/00}^t$ is the total return of said index from the starting date to the day t.

65. A computer program for managing a mortgage-backed securities index according to claim 64, wherein said starting level of said index is 100.

66. A computer program for managing a mortgage-backed securities index according to claim 63 further comprising an output segment, said output segment displaying said level of said mortgage-backed securities index and said total return of said mortgage-backed securities index to the user.

* * * * *